(12) United States Patent
Zmijewski et al.

(10) Patent No.: US 12,502,611 B2
(45) Date of Patent: Dec. 23, 2025

(54) METHOD AND APPARATUS FOR VALIDATING SOFTWARE USE ON AN APPARATUS

(71) Applicant: IRON GAMING LIMITED, St. Julians (MT)

(72) Inventors: Peter Zmijewski, Singapore (SG); Scott Dowdell, Singapore (SG)

(73) Assignee: IRON GAMING LIMITED, St. Julians (MT)

( * ) Notice: Subject to any disclaimer, the term of this patent is extended or adjusted under 35 U.S.C. 154(b) by 301 days.

(21) Appl. No.: 18/207,528

(22) Filed: Jun. 8, 2023

(65) Prior Publication Data
US 2023/0398459 A1 Dec. 14, 2023

(30) Foreign Application Priority Data
Jun. 9, 2022 (SG) .............................. 10202250106F

(51) Int. Cl.
| | |
|---|---|
| A63F 13/75 | (2014.01) |
| A63F 13/70 | (2014.01) |
| A63F 13/77 | (2014.01) |
| A63F 13/79 | (2014.01) |
| G06F 16/2455 | (2019.01) |
| G06F 21/64 | (2013.01) |
| G07F 17/32 | (2006.01) |

(52) U.S. Cl.
CPC .............. *A63F 13/75* (2014.09); *A63F 13/70* (2014.09); *A63F 13/77* (2014.09); *A63F 13/79* (2014.09); *G06F 16/24568* (2019.01); *G06F 21/64* (2013.01); *G07F 17/3241* (2013.01)

(58) Field of Classification Search
None
See application file for complete search history.

(56) References Cited

U.S. PATENT DOCUMENTS

| | | | | |
|---|---|---|---|---|
| 2020/0155944 | A1* | 5/2020 | Witchey | ................ H04L 9/3239 |
| 2020/0406147 | A1* | 12/2020 | Gauffin | ................ G07F 17/3241 |
| 2022/0092927 | A1* | 3/2022 | Huke | .................. G07F 17/3239 |
| 2023/0241511 | A1* | 8/2023 | Boudaoud | ............. A63F 13/426 |
| | | | | 463/29 |

OTHER PUBLICATIONS

Search Report received in counterpart Singapore Application No. 10202250106F, dated Oct. 28, 2024, 2 pages.
Written Opinion received in counterpart Singapore Application No. 10202250106F, dated Oct. 29, 2024, 6 pages.

\* cited by examiner

*Primary Examiner* — Jason T Yen
(74) *Attorney, Agent, or Firm* — Klarquist Sparkman, LLP

(57) ABSTRACT

A method and an apparatus for validating software usage are described. The method involves collecting data containing user activity data when a piece of software is running and being used by a user, periodically generating a data packet containing the data collected to obtain a plurality of the data packets; verifying that each data packet is generated according to predetermined rules, checking the collected data contained in a plurality of verified data packets to determine whether the user is using the software, and checking whether the checked collected data have similarity with past collected data that exceeds a predetermined level of similarity. Software usage by a user is deemed to be validated if it is determined that the user is using the software and no past collected data exceeding the predetermined level of similarity is found.

43 Claims, 10 Drawing Sheets

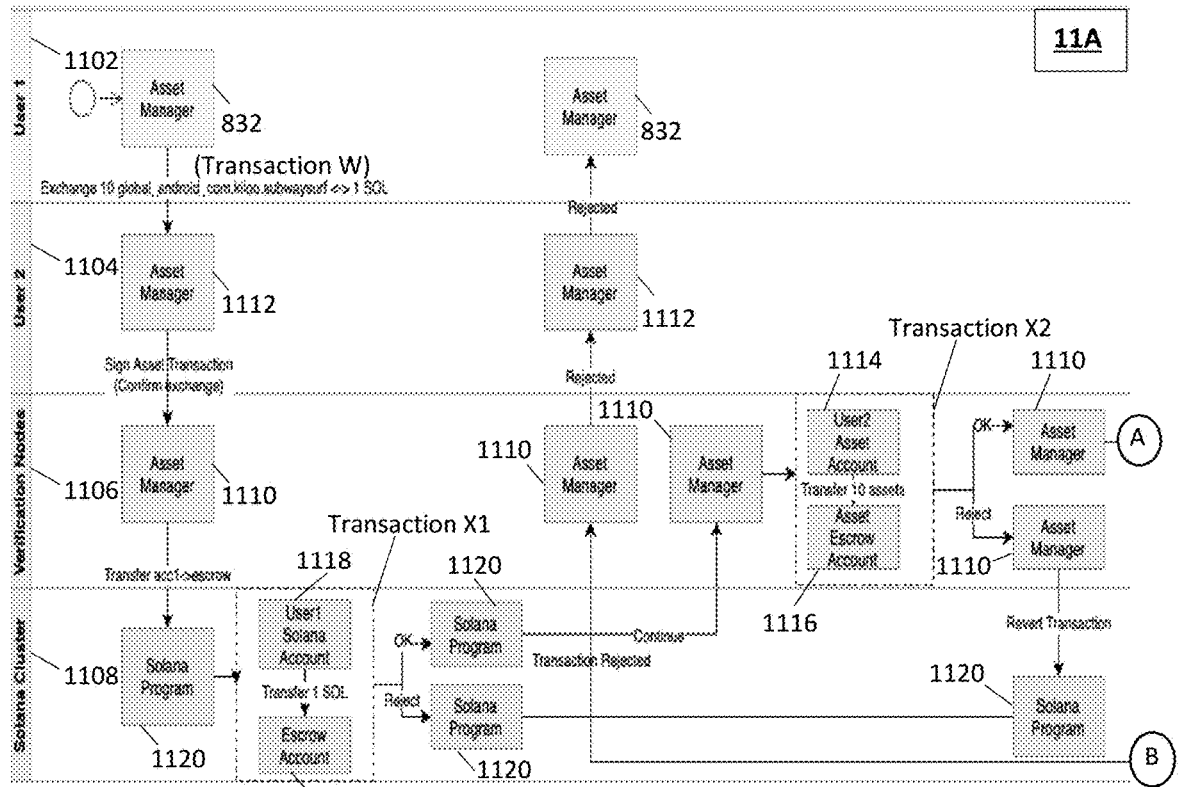
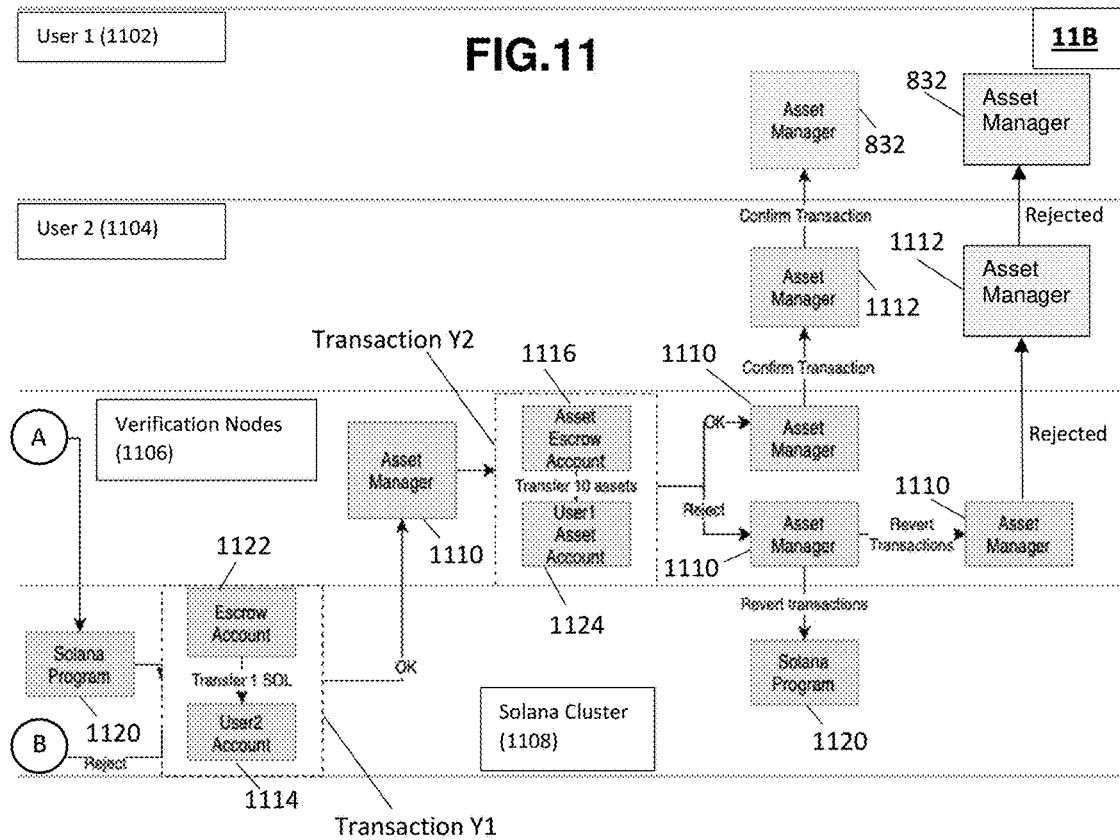
FIG.11

METHOD AND APPARATUS FOR VALIDATING SOFTWARE USE ON AN APPARATUS

FIELD

The field relates to a method and an apparatus for validating software use on an apparatus. In particular, the software may be a game software and the validation may be performed with the help of a blockchain network and/or a neural network.

BACKGROUND

In the gaming industry, there exists play-to-earn game software wherein rewards are given to gamers for game play. For instance, tokens including Non-Fungible Tokens (NFT), coins, and the like may be given. Typically, the rewards are given based on the gamer's performance during game play. For instance, the higher the ranking and/or score of a gamer during a game, the better the rewards. Application Programming Interfaces (APIs) may be used to collect data from a game software after a game is played to determine the ranking and/or score, and correspondingly the rewards to be given.

SUMMARY

According to an example of the present disclosure, there are provided an apparatus and method as claimed in the independent claims. Some optional features are defined in the dependent claims.

BRIEF DESCRIPTION OF THE DRAWINGS

Examples in the present disclosure will be better understood and readily apparent to one skilled in the art from the following written description, by way of example only and in conjunction with the drawings, in which:

FIG. 11 illustrates the operations of the asset manager of FIG. 10.

DETAILED DESCRIPTION

Figure 1:
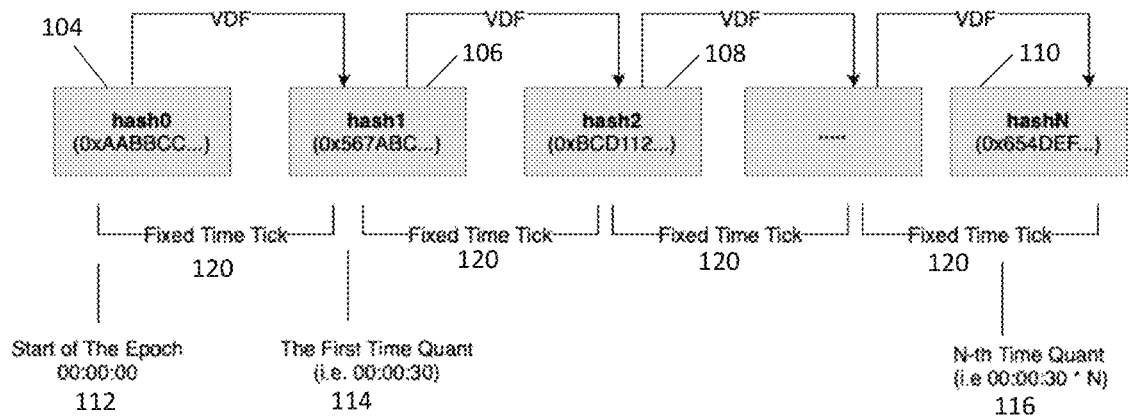
FIG. 1 illustrates how software usage time is ensured via periodic generation of hashed data from user software usage data collected by an apparatus according to an example of the present disclosure.

An example of a method and an apparatus of the present disclosure is capable of rewarding a user for software use such as a player or a gamer playing a game software based on time duration of game play. This can be implemented in addition to rewarding the gamer for its performance. The game software is run on the apparatus, which may be a personal computer, a desktop computer, a server computer (in short "server"), a video game console, a smart television (TV), a TV box (e.g., android box) or similar device, a portable or laptop computer, a smartphone, a tab or pad device, and the like. The terms "user", "player" and "gamer" are used interchangeably in the present disclosure.

For instance, a gamer who played for 2 hours with poor performance may be rewarded similarly for a gamer who played for 1 hour with good performance. In another example, a gamer may be rewarded purely based on the amount of time of game play regardless of game performance. Validation of the game play time is important to prevent cheating. Cheating includes scenarios such as a gamer uploading a replay of a game to get rewards a second time, a gamer idling during game play and not actively engaging in game play, and/or a situation in which a gamer programmed a bot to play a game automatically in place of a real human gamer. Existing play-to-earn game software is not capable of validating the time duration of game play to prevent such cheating because they are typically designed to extract rankings and/or scores from games after game play to determine the rewards to be given.

The apparatus of the example may be configured to verify that each user used a software, or more specifically in the present example, played a game for a specific amount of time, and to reward the user with coins (i.e., cryptocurrency), tokens and/or assets (e.g., game assets like game credits, game items, game accessories, etc.) proportionally with the amount of time of game play. For instance, the user may send digitally signed game data of a private game played on the apparatus to one or more verification nodes of a blockchain network to verity these game data, and approve or reject the writing or updating of these game data to a blockchain network. To verify the time of game play, the apparatus may be configured to send recent user activity data and timestamps. Thresholds may be set to determine the recentness of the user activity data. Timestamps can be easily modified, and the game can be played once before and the user sends a replay (e.g., video and/or audio recording) again and again instead of actually playing the game. Furthermore, dishonest players can create many accounts and interchange play data among them to get more rewards unfairly. A dishonest player can also write an Artificial Intelligence (A.I.) script i.e., program a bot, which will play automatically and get rewards unfairly. Such cheating should not be rewarded.

One solution to the aforementioned cheating problems is to utilise, for example, a Neural Network Black Box (NNBB), which receives, as input, timestamp and any one or combination of the following data (not limited to): key pressed, mouse movement/clicks, screenshots, video cam screens, voice recording, and/or any other form of biometric information inputs such as eye tracking. As output, the NNBB may be configured to return true or false as fuzzy Boolean, which indicates that the inputted data is verified (true) or not (false). The NNBB may be trained to detect that the inputted data is generated by human or by a bot. If the data comes from a bot, verification result is false. The data must be generated by a human to be verified as true.

Alternatively, in another example, the NNBB is not used and there can be an apparatus or system configured or programmed to process user data to determine the same true or false results. For instance, the properties of a video recording contained in the user data, such as the creation timing and date can be checked to determine that a sound or video recording in the data is just captured or captured at an expected or predetermined timeframe, and not a pre-recording or replay created at an earlier time. There may also be watermarks and/or encoded data in the sound or video recording to verify their authenticity and timing accuracy. The sound or video recording may also be compared with past sound or video recordings to ensure that it is not duplicated. The sound or video recording may be processed to determine that a human indeed spent time in front of a screen to play the game by analysing the audio input and images captured. User gestures captured in images may be analysed to verify that a user indeed played a game. The key presses, text entered, snapshots, and/or biometric information entered by the user during game play may also be analysed to confirm that a user indeed played a game. Furthermore, the facial information of the user may be analysed to ensure that the user is indeed a registered user associated to a user account. In yet another example, such apparatus or system may be used in addition to the NNBB to check that a user's game data is valid and there is no cheating.

In one example of the present disclosure, in the decision to give rewards to a user for using a software, for instance, for playing a game software, it is important to validate (or verity) the time of game play by a user. One has to be sure that the time was really spent by the user and that the timestamps associated with the game play are not created through unauthorised means. Certain rules have to be pre-determined to validate or verify the time of game play.

Verifiable Delay Function (VDF), which is used in Solana or Chia blockchain networks may be used for the time validation. It is based on a concept that user activity data is sequentially hashed and the hashing cannot be performed in a parallelized manner.

For example:
hash0=AABBCCDD . . .
hash1=hash(hash( . . . (hash(hash1)) . . . ))
hash2=hash(hash( . . . (hash(hash2)) . . . ))
. . .

Applying VDF, time is constant between each two consecutive sets of hashed data in a sequence of hashes. A hash refers to a set of data that is hashed. The constant time period between each two consecutive sets of hashed data can be known as hash time distance. The hashes in the sequence can be used as timestamps as each hash is associated with a specific time. The node and/or software component in the blockchain network, which generates this hash, can be given a name called, a timelord, like in the Chia blockchain network. The blockchain network of the present example can contain several timelords, which are used to generate these timestamps.

In one scenario, a user is playing a game software on an apparatus and would like to be rewarded for the game play. The game activity of the user to be verified for giving rewards to the user may be divided or split into data chunks or packets for efficient handling. Each data packet is to be hashed. So if a user played a one hour game, the user's game activity may be split into N packets, wherein N depends on the time length of the packet, which depends on the hash time distance of a timelord's hashes (see below). For example, if the time length of a packet is 10 seconds, then a one hour game will be spit into 60×10 (in total, 600) packets, and every packet will be sent to the blockchain network for verification that they are generated according to the rules of the timelord.

A user may be required to electronically or digitally sign its user activity data to enable it to be authenticated later. Specifically, the user has to sign a data packet (containing user activity data) between two timestamps, and then send the data packet to the blockchain network for validation or verification. The validation or verification includes authentication of the electronic or digital signature of the user. The data must be sent as soon as possible (especially if the user data is to be processed in real-time) to protect the blockchain network from incorrectly crafting historical data with outdated timestamps. The blockchain network should reject all non-recent data, for example, it can be required that the time distance between two consecutively created data packets must be less than 6 hashes. That is, if time distance (or time quant) between a hash1 (first data packet) and a hash2 (second data packet) is 10 seconds, user data for this time period must be sent for verification within 1 minute after collecting it from the user's apparatus, and creating a 10-seconds packet. Data and timestamp should be hashed together to be sure of data consistency, for example:

For timestamp=hash1, the packet "[hash(data, hash1)|hash1|data]" would be sent for verification.

FIG. 1 illustrates time-related data generation by a timelord 102, which is a software component executed on an apparatus, which a user is running a piece of software. This apparatus may be a node configured to perform duties of the timelord 102 in a blockchain network. User software usage data is collected at the apparatus and the collected data is divided into a plurality of data packets. The timelord 102 is configured to have each data packet hashed periodically, and in the present example, hashed data packets, hash0 104, hash1 106, hash2 108, . . . , hashN 110 are sequentially generated. VDF is applied to each of these hashed data packets. The time period of the hashing is a fixed time tick 120 (also known as time distance), for example, 30 seconds. This means that once 30 seconds of user software usage data is collected, the 30 seconds worth of data is hashed. Each data packet is associated with a time period of user software usage. The creation of the first hashed data, hash0 104 corresponds to the time of the start of epoch i.e., the beginning of the user software usage (start time: 00:00:00). Hash0 104 contains hashed user software usage data collected in the first 30 seconds of the user's software usage. The second hashed data corresponds to a first time quant 114 i.e., the start of the second 30 seconds of the user's software usage (time elapsed: 00:00:30). Hash1 106 contains hashed user software usage data collected in the second 30 seconds of the user's software usage. The same applies for hash2 108 and so on until hashN 110, which is the final Nth time quant 116 i.e., contains the final 30 seconds worth of collected hashed user software usage data (time elapsed 00:00:30×N).

The user software usage data may be collected and processed (1) in real-time as a user is using the software on the apparatus and data packets are created periodically, or (2) after the user has completed the usage of the software for a pre-determined period of time. In the case of (2), it could be, for instance, that a user first completes a game using a software, and the data of the game is processed thereafter.

Each of the data packet or data chunk has to be validated or verified (i.e., checked) to ensure that it is generated in chronological order according to the predetermined rules. In the above example, the rules involve VDF and hashing. Validation or verification of the predetermined rules may also include authentication of digital signatures in data packets.

Figure 2:
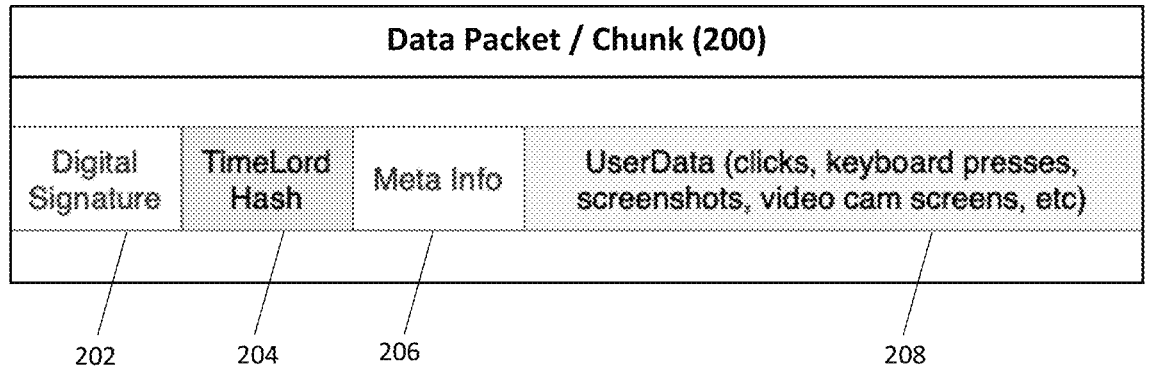
FIG. 2 illustrates data structure of a data packet or data chunk containing data collected in a fraction of time of a user's software usage.

With reference to FIG. 2, as an example, the data structure of each data packet or data chunk 200 may comprise several data parts as follows:

1. Digital signature 202—In the present example, this is a signed hash by a public key associated with a user. Generally, a digital signature is proof that a digital message, data, file, or document was not modified— intentionally or unintentionally—from the time it was signed. Digital signatures typically involves generating a unique hash of the message, file, data or document in question, and encrypting it using a sender's private or public key.
2. TimeLord Hash 204—A timestamp was generated by the time lord described with reference to FIG. 1. Such timestamp enables time distance between every two consecutive data packets to be verified. This time distance can be checked against a threshold to determine whether a time distance requirement is satisfied. For example, the threshold can be set as a 30 seconds interval and if two consecutive data packets are more than 30 seconds apart, the time distance requirement will not be satisfied.
3. Meta Info 206—This refers to meta information, which may be required to verity the data packet or data chunk.
4. User Data 208—All user data collected within the time period associated with the data packet or data chunk, which may include, but not limited to any one or combination of the following: mouse movements, mouse clicks, keyboard presses, screenshot or video recording of the application or software used by the user, screenshot or video recording of a web or device camera of the user, audio information, etc.

During the verification of the data packet 200, a hash-based verification of the hashed data packet 200 and/or the TimeLord Hash 204 may be performed, the time distance requirement may be checked, the meta information 206 may be verified, and/or the digital signature 202 may be authenticated. The successful verification of these 3 items ensures that the data packet 200 is generated in chronological order according to the predetermined rules. The user data 208 is validated using a Neural Network Black Box (NNBB) validator, which has an NNBB model. The user data 208 and/or one or more features may be extracted from the user data 208 to input to the NNBB model to predict whether the user is indeed using the software during the time period associated with the data packet 200. In another example, the user data 208 may be validated without the help of neural network. For example, software such as an Application Programming Interface may be used for the validation. Once all the 4 aforementioned items of the data packet 200 are verified successfully, the data packet 200 is said to be validated.

The hash-based verification described above refers to ensuring that data being verified has not been corrupted by comparing the data's hash value to a previously calculated value. If these values match, the data is presumed to be unmodified.

The verification of the data packet 200 may be conducted by M number of random verification nodes in the blockchain network. Each of such verification nodes refer to any node or specific designated nodes in the blockchain network. Preferably, the data originating from one node should be verified by another different node in the blockchain network.

In one example, any node in the blockchain network can verify a user's data, and there is no distinction between a user node (or a regular node) that is configured for software use only, and a verification node that is configured for verifying user data only in the blockchain network. In this example, all user or regular nodes can also perform verification and act as verification nodes. However, in consideration of possible high bandwidth required for verification, in another example, there can be a distinction between regular nodes and verification nodes and they are each specialised for software usage and user data verification respectively. In this way, software usage will not be affected by the processing and/or data transmission required during user data verification, and vice versa.

In another example, a regular node configured for software use may start off as a regular node and get promoted to become a verification node configured to verify user data and for software use upon satisfying certain condition or conditions. For instance, a plurality of verification nodes can be selected based on a Proof of Stake consensus, or similar scheme, which means that if a user or regular node would like to become a verification node it should hold an amount of coins or tokens in the blockchain network in order to be promoted to a verification node. Weightage in verification result between verification nodes can vary between different verification nodes. For instance, the weightage in verification result may be proportional to the amount of coins or tokens held by each verification node. That is, the more coins or token held in a user account associated with a verification node, the higher the weightage in verification result. If user data being verified is valid (i.e., not created or manipulated in an unauthorised manner) and/or no cheating is detected, each verification node may validate the user data by signing it with a private key and produce a validation result. For example, if 51% of randomly selected verification nodes indicate that the user data being verified is valid data, post validation action or actions can take place. Post validation action or actions can include calculation of a reward to be awarded to the user account of the user whom sent the user data for verification. It may be configured that the longer the time the user spends to use the software (or in the case of gaming, the time the user spends to play games), the better the rewards to be given to the user.

Figure 3:
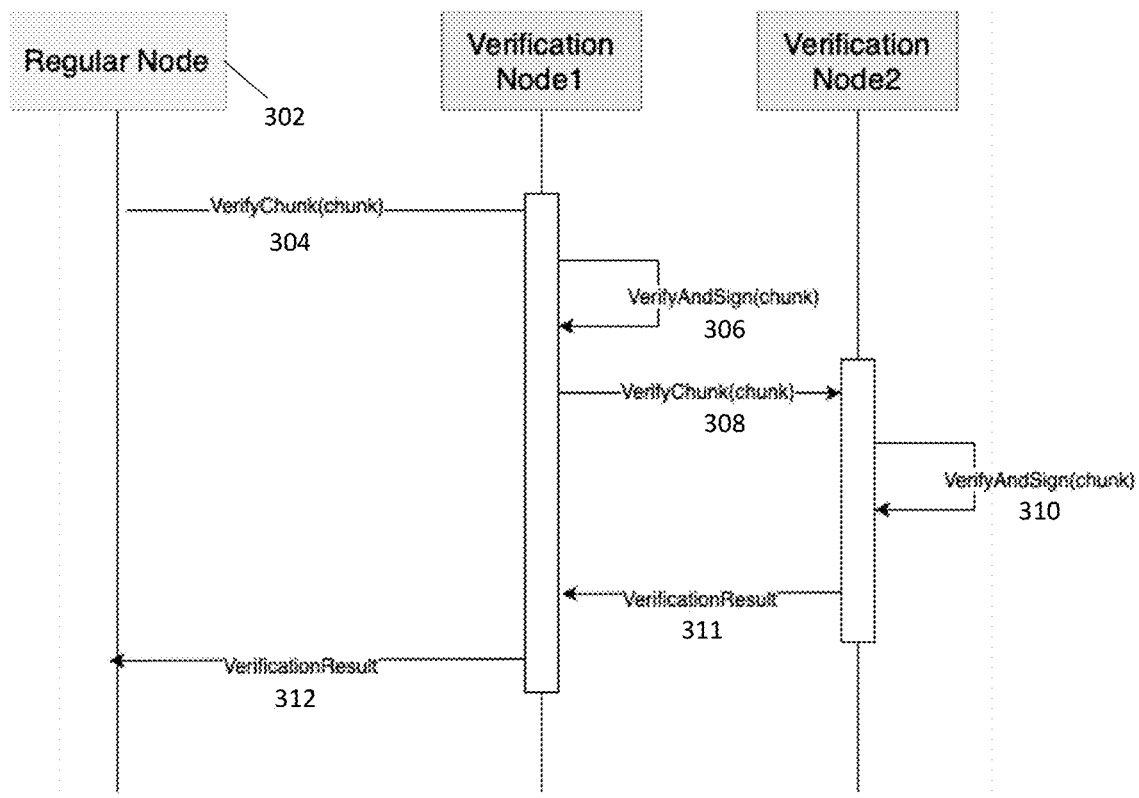
FIG. 3 illustrates how the data packet or data chunk of FIG. 2 is verified to check that time information associated with the data packet or data chunk is authentic and valid.

FIG. 3 shows a flowchart illustrating an example of a verification process flow involving a regular node 302 and two verification nodes, Node1 and Node2 in a blockchain network. Data is collected when a user is using a software on an apparatus. A plurality of data packets or chunks are created for the collected data. Each data chunk is created for user data collected within a fraction of time of the user's software usage. The plurality of data chunks are created sequentially in chronological order and created periodically according to a fixed time interval. Each data chunk is sent to Node1 for verification at a step 304. Node1 verifies the data chunk and if Node1 determines that the data chunk is valid, Node1 digitally signs off the data chunk at a step 306. Thereafter, at a step 308, Node1 sends the data chunk for verification by Node2. Node2 verifies the data chunk and if Node2 determines that the data chunk is valid, Node2 digitally signs off the data chunk at a step 310. Node2 can send its verification result to Node1 at a step 311 and Node1 can collate verification results from other nodes such as Node2 to produce a final verification result for sending to the regular node 302 at a step 312. The regular node 302, the Node1 and/or the Node2 can be configured to send the data chunk to a pre-determined number of Nodes for the verification of the data chunk in a manner similar to that described with reference to FIG. 3.

In addition to verification of each data packet or data chunk, there can be a further process to determine whether a user is unfairly sending a replay of past user activity.

In one example, a user generates user data on a regular node (i.e., an apparatus) in a blockchain network. The user data includes data of one or more activities occurring when a piece of software is used on the regular node. The user data is divided into data packets. Each data packet contains, for example, 10 seconds worth of activities occurring in the time period. Each data packet may be created after every 10 seconds and hashed. Each data packet in this example has the same data structure as the data packet 200 described with reference to FIG. 2. After the hash-based verification of the hashed data packet and/or the TimeLord Hash 204 is performed, the time distance requirement is checked, the meta information 206 is verified, and/or the digital signature 202 is authenticated, the time aspects of the data packet is said to be validated. This means that the data packet (and its time stamp) is generated in accordance with the predetermined rules. The user data 208 contained in the data packet is validated through an NNBB validator or a software component such as an Application Programming Interface (API) to determine whether the user data 208 shows that the user has indeed used the software. If the user data 208 shows that the user is indeed using the software, the user data 208 is validated. Once items 202 to 208 of the data packet are validated, another process to check whether the user has unfairly sent a replay of past user activity is performed. This process is described with reference to FIG. 4 as follows.

Figure 4:
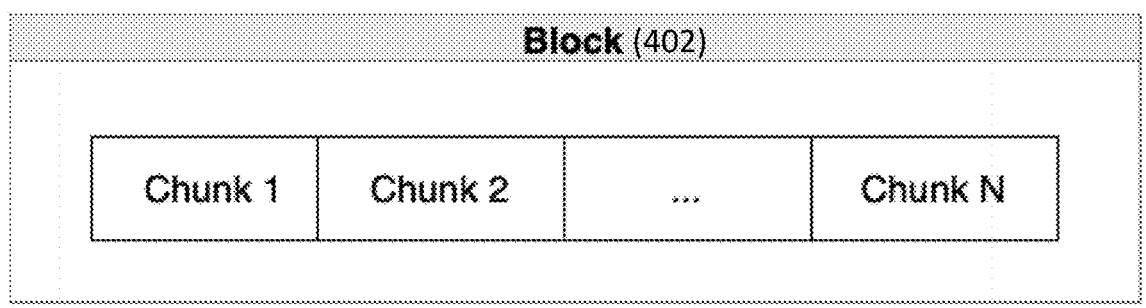
FIG. 4 illustrates a data structure of a data block made up of a plurality of the data packet or data chunk of FIG. 2 and FIG. 3.

With reference to FIG. 4, each data packet (or data chunk) can be combined with another data packet (or data chunk) that has been validated. The combination of a plurality of data packets, chunk1, chunk2 . . . , and chunkN creates a minimal time resolution data block 402. This data block 402 can contain, for example, 5 to 10 minutes worth of data packets.

For example, after the data block 402 is created, the data block 402 may contain the data of all the data packets that are concatenated in sequence (i.e., in the sequence of the creation of the data packets) to form the data block 402.

The data block 402 may contain or further contain:
1. Timestamp—One or more timestamps indicative of the time period of the user software usage data the data block 402 contains.
2. Application ID—There can be a plurality of software a user uses on the regular node, and this application identifier (ID) is unique to each software used.
3. Data Segment—For example, this data segment may contain the data packets that are concatenated in sequence to form the data block. In another example, this data segment may contain combined user activity data obtained from the User Data 208 of FIG. 2 (e.g., including the keys pressed, mouse movements and/or more) of each data packet that is concatenated in series. For instance, if each data packet contains a video showing user usage for 10 seconds, the videos from a plurality of data packets may be combined to form a video showing user usage for a longer time, such as 10 or 15 minutes.
4. One or more signatures of validated time stamps by verification nodes.

As described earlier, each data packet (e.g., the data packet 200) has to be validated before they are combined to form the data block 402. In one example, with regard to the NNBB validator used for validating each data packet, if, for example, at least 51% of the NNBB validators of the nodes such as the verification nodes in the blockchain network indicate that the user data (e.g., user data 208) of the data packet is valid, the data packet can be marked as preliminary valid. These preliminary valid data packets can be combined to form the data block 402.

After being formed, the data block 402 may be sent to verification nodes for final validation. During the final validation, verification nodes performs a check to confirm that the data block 402 does not have near duplicates in the blockchain history. Near duplicate data is defined as a data block in the blockchain history that has a high degree of similarity as the data block 402 being validated. For example, a data similarity threshold may be predefined and used to determine whether a near duplicate exists in the blockchain history for a data block being validated.

In a specific example, the data block 402 may comprise User Activity Data relating to 5 actions: swipe left, swipe right, swipe up, swipe down, and tap. These are finger actions performed by a user on a touchscreen for a game software running on an apparatus. Each action maybe assigned a character: A—swipe left, B—swipe right, C—swipe up, D—swipe down, and E—tap. After assigning characters, the user actions may be encoded as a string sequence.

For example, two sequences of user actions can be encoded as string 1: AAABBBCCCDDD and string 2: AAABBCCCDED. There are two characters in these two string sequences that are different i.e., "BBB" in string 1 vs "BBC" in string 2 and "DDD" in string 1 vs "DED" in string 2. In one example, these two string sequences may be user data and they may be considered as near duplicates. With 2 out of 12 characters that are different, the difference in percentage is roughly 16%, and 84% of the two string sequences is identical. A threshold of 80% similarity can be set as a reference for detecting near duplicates, and since these two string sequences are 84% similar, which is above 80% similarity, they are considered as near duplicates. In other examples, similarity distance between two sequences can be determined using various algorithms, for example the Levenstain-distance algorithm. In yet another example, the NNBB may be configured for near duplicate detection.

In another example, two sequences of user actions can be encoded as string 3: A, T1, A, T2, B, T3, B, T4, B, T5, and string 4: A, T1', A, T2', B, T3', B, T4', B, T5. A, A, B, B, B in string 3 refer to text or commands entered sequentially by a user and T1, T2, T3, T4, and T5 correspond to the time each respective text or command A, A, B, B, B is entered by the user. Similarly, A, A, B, B, B in string 4 refer to text or commands entered sequentially by a user, and T1', T2', T3, T4', and T5' correspond to the time each respective text or command A, A, B, B, B is entered by the user. In the usage of certain software, the text or commands entered by any user can be exactly or largely the same. For example, a game may require all users to enter the same text or commands and the winning criteria may be dependent on the speed of entry of the text or commands and/or the difference in the time interval between the entry of text or commands. It is extremely difficult or impossible for a human to replicate exact timing in the entry of text or commands, especially if the accuracy for the time capturing is set as, milliseconds or even microseconds. Hence, the difference in the time of entry of each text or command can be a good indicator of whether a user has send a replay of past software usage for verification or validated. Therefore, for certain software, the capturing of the time of entry of each command can be a requirement to enable similarity comparison between 2 strings of commands. To reduce the computing effort, it could be that the strings are captured in the following manner, A, A, T1, B, B, B, T2, wherein the time of entry of text or commands T1 and T2 are captured after a predetermined number of commands or text have been entered. In the case of T1, it is captured after 2 text or commands AA is entered, and for T2, it is captured after 3 text or commands BBB is entered.

The string sequences discussed above may be string sequences or data sequences that have been subjected to hashing (i.e., hash of string sequences or data sequences).

Checking for near duplicates helps to prevent users from sending replay history for validation unfairly. For instance, a user saves a game that was played only once, and keeps resending the same game data again and again to the blockchain network for validation to earn coins or tokens unfairly.

If a data block is found to have one or more near duplicates, it can be determined that final validation of the data block failed and the data block will not be written (or updated or saved) in the blockchain network.

If a data block has no near duplicate, it can be saved in the blockchain network and the user can be rewarded with one or more coins or tokens. The transfer of the one or more coins or tokens can be a transaction record in the blockchain network. A transaction is a blockchain network record, which contains information about transfer of coins and/or tokens and/or other assets from one account to another account such as from a unique reward address to a user address. The user address can be a wallet address associated with a user account of the user whom sent the data block for validation. A proof of transaction verification process can be performed for this coin and/or token transfer transaction. This transaction can be verified by any node or specific verification nodes in the blockchain network.

In one example, a node makes a request for user data validation, and a network of verification nodes in the blockchain network validates the user data with the help of NNBB as described above. If the user data is valid, the blockchain network can for instance, create a transaction from a special (reward) account with, for instance, an account address 0 to send coins or tokens to the user address of the user associated with the user data. This transaction is saved to blockchain and the verification or validation nodes spreads this transaction across the network.

In another example, it could be that the data packet such as the data packet 200 is deemed as preliminary valid after the hash-based verification of the hashed data packet and/or the TimeLord Hash 204 is performed, the time distance requirement is checked, the meta information 206 is verified, and/or the digital signature 202 is authenticated i.e., after the time aspects of the data packet are validated. The user data 208 of each data packet is verified after a plurality of preliminary valid data packets are combined to form the data block 402. The combined user data 208 (i.e., User Activity Data) of the plurality of preliminary valid data packets in data block 402 is verified by one or more of the NNBB validator described earlier, which uses an NNBB model to predict whether the user is using the software during the time period associated with the data block 402. The data block 402 will be subjected to the Near duplicates check after the User Activity Data of the data block 402 is validated.

Figure 5:
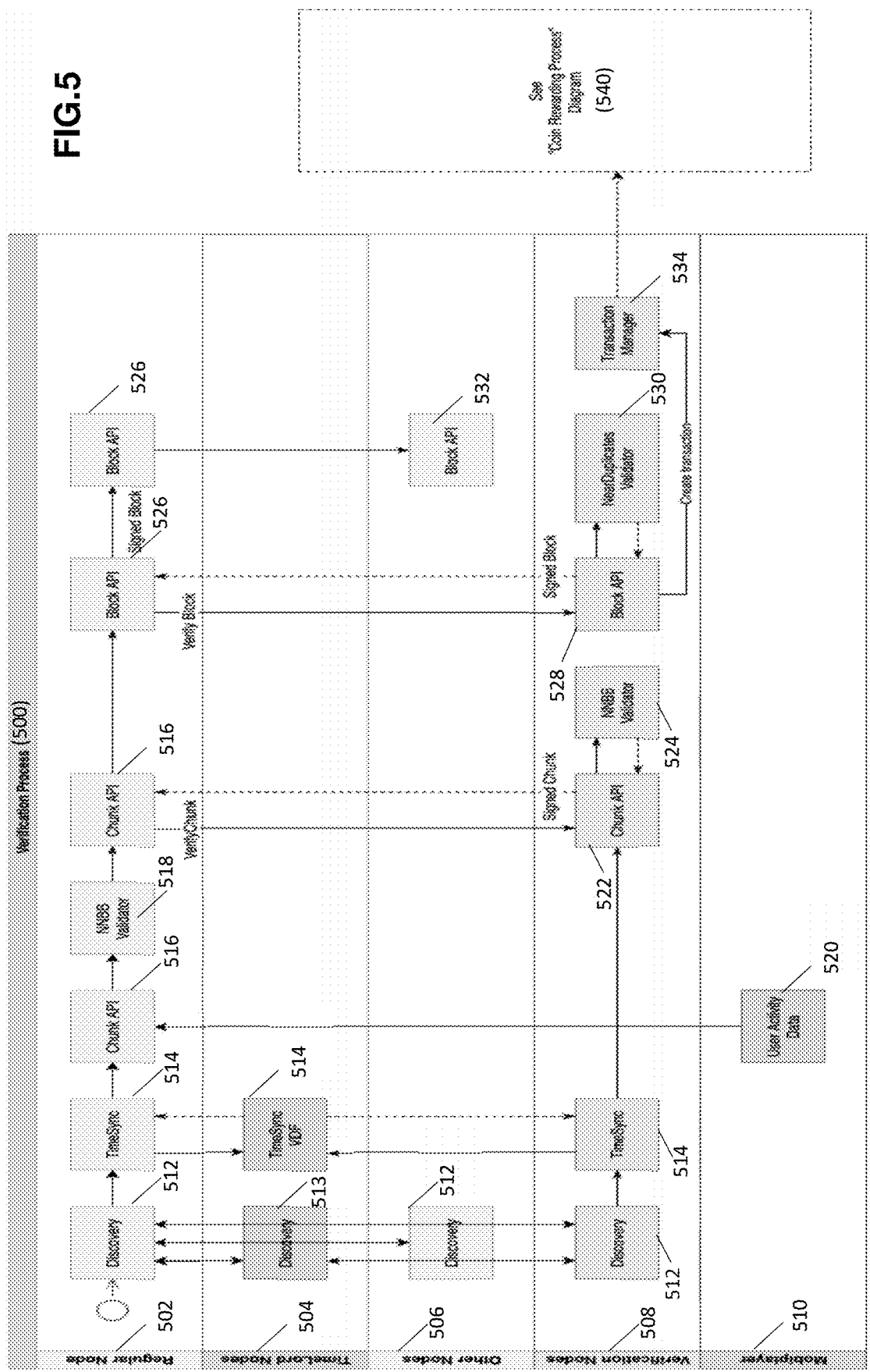
FIG. 5 illustrates a verification process according to an example of the present disclosure, which comprises steps for verifying time information of data packets or data chunks and for verifying user software usage data to determine whether a user indeed uses a piece of software.

FIG. 5 shows an example of a verification process 500 comprising the features discussed earlier.

There is present one regular node 502, on which a user uses a software. There are also one or more timelord nodes 504 for performing duties of the timelord 102 described with reference to FIG. 1 earlier. Furthermore, there are one or more other nodes 506 like the regular nodes, and one or more verification nodes 508 for verifying data packets or chunks and data blocks created from the combination of more than one data packets or chunks. All these nodes are nodes in a blockchain network.

Each regular node 502 or 506 may comprise a timelord node 504 or it can also be that the timelord node 504 is a separate node from the regular node 502 or 506.

There is a piece of software or software component called Mobiplayer 510 running on each regular node 502 and 506, which is used to monitor the software being used. Mobiplayer 510 is responsible for collecting user activity data 520 related to the use of the software by the user, such as those described for the User Data 208 of FIG. 2.

After the Mobiplayer 510 collected user activity data 520, the regular node 502 performs a discovery process 512 to find the timelord nodes 504 and the verification nodes 508 to perform verification processes for the collected user activity data 520. The one or more timelord nodes 504 may also be configured to perform a discovery process to search for one or more verification nodes 508 to perform hash-based verification of hashed data packets and/or the TimeLord Hash (e.g., 204 in FIG. 2), check time distance requirement, verify meta information (e.g., 206 in FIG. 2), and/or authenticate digital signature (e.g., 202 in FIG. 2).

The one or more other nodes 506 may be discovered in the discovery process 512 of the regular node 502 but they will not participate in verification or perform timelord duties.

After discovery 512, the regular node 502 performs time synchronization (TimeSync) 514 and sends data to the one or more timelord nodes 504 to perform Verifiable Delay Function (VDF) (i.e., TimeSync VDF in FIG. 5). The time synchronization 514 is between peers. During TimeSync 514, at least the regular node 502, the one or more timelord nodes 504, and the one or more verification nodes 508 may be connected dynamically using connection tools such as WebRTC or WebSockets, so that they all converge to a single, common time in the blockchain network. Occurring concurrently with TimeSync 514, the collected user activity data 520 from Mobiplayer 510 is divided into data packets or chunks by a Chunk Application Programming Interface (Chunk API) 516 of the regular node 502, wherein each data chunk is subjected to hashing. A Chunk API is a software component for creating data chunks and data blocks made up of data chunks. The one or more timelord nodes 504 will each apply VDF to the hashed data packets generated for the collected user activity data 520 in a manner as described earlier with reference to FIG. 1. The end result is that each hashed data packet contains data associated with a predetermined time interval (i.e., the fixed time tick 120 in FIG. 1) (for instance, 20 seconds) of the user activity data 520.

Assuming that each data packet has the data structure of the data packet 200 of FIG. 2, during the TimeSync VDF operation at the one or more timelord nodes 504, the data packets may be sent to the one or more verification nodes 508 to perform one or more of the following:
  a) hash-based verification of the hashed data packet and/or the TimeLord Hash 204 of FIG. 2;
  b) checking the time distance requirement;
  c) verifying the meta information 206 of FIG. 2: and/or
  d) authenticating the digital signature 202 of FIG. 2.

It can be said that the time stamp of the data packet is validated once the aforementioned are successfully verified. The user data 208 of FIG. 2 contained in the data packet can be validated in a separate process as follows, which is similar to the process described with reference to FIG. 4. If a data packet is not successfully verified, the verification process 500 ends and the user may not be rewarded with coins, tokens and/or assets.

After the hashed data packets are generated and successfully verified, each data packet is validated by a Neural Network Black Box (NNBB) validator 518. An NNBB validator is a software component using an NNBB for validating user data in each data packet to determine whether the user indeed uses the software during the time interval associated with the data packet. Through a trained model, the NNBB validator 518 predicts from the user data in the data packet whether the user indeed uses the software during the time interval associated with the data packet. After the NNBB validator 518 produces a positive validation result (i.e., it is confirmed that the user indeed uses the software fairly without cheating) for a data packet, the data packet is sent from the Chunk API 516 of the regular node 502 to a Chunk API 522 of the one or more verification nodes 508. The Chunk API 522 of each of the one or more verification nodes 508 is a software component that will forward the data packet to a NNBB validator 524 at each of the one or more verification nodes 508. The NNBB validator 524 will predict from the user data in the received data packet whether the user indeed uses the software during the time interval associated with the data packet. If the NNBB validator 524 produces a positive validation result (i.e., it is confirmed that the user indeed uses the software fairly without cheating), the Chunk API 522 digitally signs off the data packet and sends the signed data packet to the Chunk API 516 of the regular node 502. If cheating is detected, a negative validation result will be issued for the data packet and the verification process 500 ends.

After a plurality of signed data packet are received by the Chunk API 516, they are sent to a Block API 526. A Block API is a software component used to combine the plurality of signed data packets to form a data block, and which can be used to update data blocks to the blockchain, or save them as transactions to the blockchain. The Block API 526 combines the plurality of signed data packet to create one or more data blocks. Each data block may be similar to the data block 402 of FIG. 4 and comprise data of either an entire time of collected user activity (e.g., time duration of a complete game played by a user), or a fraction of time of collected user activity (e.g., 15 minutes of play time of a 1 hour game played by a user).

The Block API 526 sends each data block it generates to a Block API 528 of the one or more verification nodes 508 for verification to determine whether there are near duplicates of the data block in the blockchain. The Block API 528 sends the received data block to a Near Duplicates validator 530 to validate whether there are near duplicates of the data block. A Near Duplicates validator is a software component for checking whether there are near duplicates in the blockchain storage (database) i.e., historical records for the data block being validated. As discussed earlier, a near duplicate refers to a data block recorded in the blockchain history that is defined as identical or very similar to the data block being validated. A threshold can be set to determine whether a data block is a near duplicate. If one or more near duplicates is found by the Near Duplicates validator 530, a negative validation result will be generated for the data block being validated. As an example, a suitable algorithm such as Levenstain-distance algorithm and/or a neural network may be used to determine whether a data block is a near duplicate of the data block being validated. If no near duplicate is found by the Near Duplicates validator 530, a positive validation result will be generated and this acts as evidence that the data block being validated does not contain data of a replay or a copy of user activities that had been validated before. In this case, the Block API 528 digitally signs off the data block and sends the signed data block to the Block API 526 of the regular node 502. Thereafter, the Block API 526 updates the blockchain storage with the signed data block and the updated data in the blockchain storage can be shared with the Block API 532 of the one or more other nodes 506, or in other cases, even the one or more timelord nodes 504 and/or the one or more verification nodes 508.

When all or a sufficient percentage (for example 51% or more) of the one or more verification nodes 508 involved in validating a data block issues a positive validation result, the Block API 532 of one of the one or more verification nodes 508 will create a transaction record through a transaction manager 534. A transaction manager is a software component such as an API for performing transaction of coins, tokens, and/or assets between user addresses (accounts). The Block API 528 that initiates creation of the transaction record can belong to the verification node 508 that is informed of the final validation result i.e., the percentage of verification nodes that issued a positive validation result for a data block. This verification node 508 that is informed of the final validation result can be the first or last verification node performing verification. The On request of the Block API 528, the transaction manager 534 performs a coin rewarding process 540, which will be described later with reference to FIG. 7.

Figure 6:
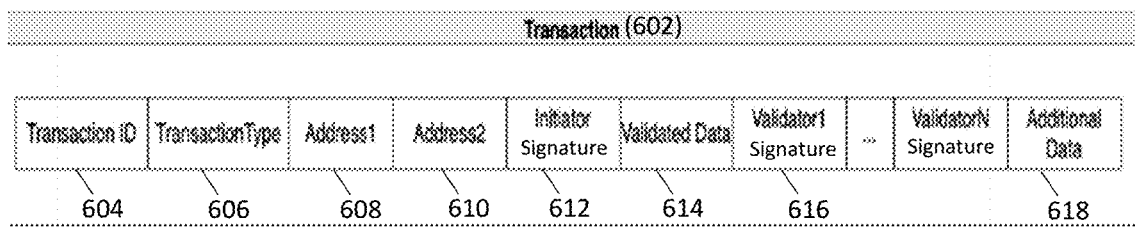
FIG. 6 illustrates a transaction record containing data of a transaction relating to transfer of coins, tokens and/or assets between blockchain addresses upon successful verification of time information and user software usage.

The transaction record created can have a data structure illustrated by the transaction record 602 in FIG. 6. For example, the transaction record 602 may have:
  a) a transaction identifier (ID) 604, which can be a unique identifier issued for each transaction;
  b) transaction type 606, which indicates the kind of transaction, for instance, asset token and/or coin issuance or exchange;
  c) coin, token and/or asset issuer's address (Address 1) 608;
  d) user address (Address 2) 610 for receiving coin, token and/or asset issued by Address 1 608;
  e) Initiator Signature 612, which is the digital signature associated with a user of the regular node 502 in FIG. 5 that initiated the verification of user activity data 520;
  f) Validated Data 614, which in the present example, can be the signed data block or the user activity data 520 of the signed data block;
  g) Validator 1 . . . Validator N Signatures 616, which refer to one or more digital signatures associated with the one or more verification nodes 508 involved in the verification process 500 of FIG. 5; and
  h) Additional Data 618, which contains any other data required of the blockchain network.

Figure 7:
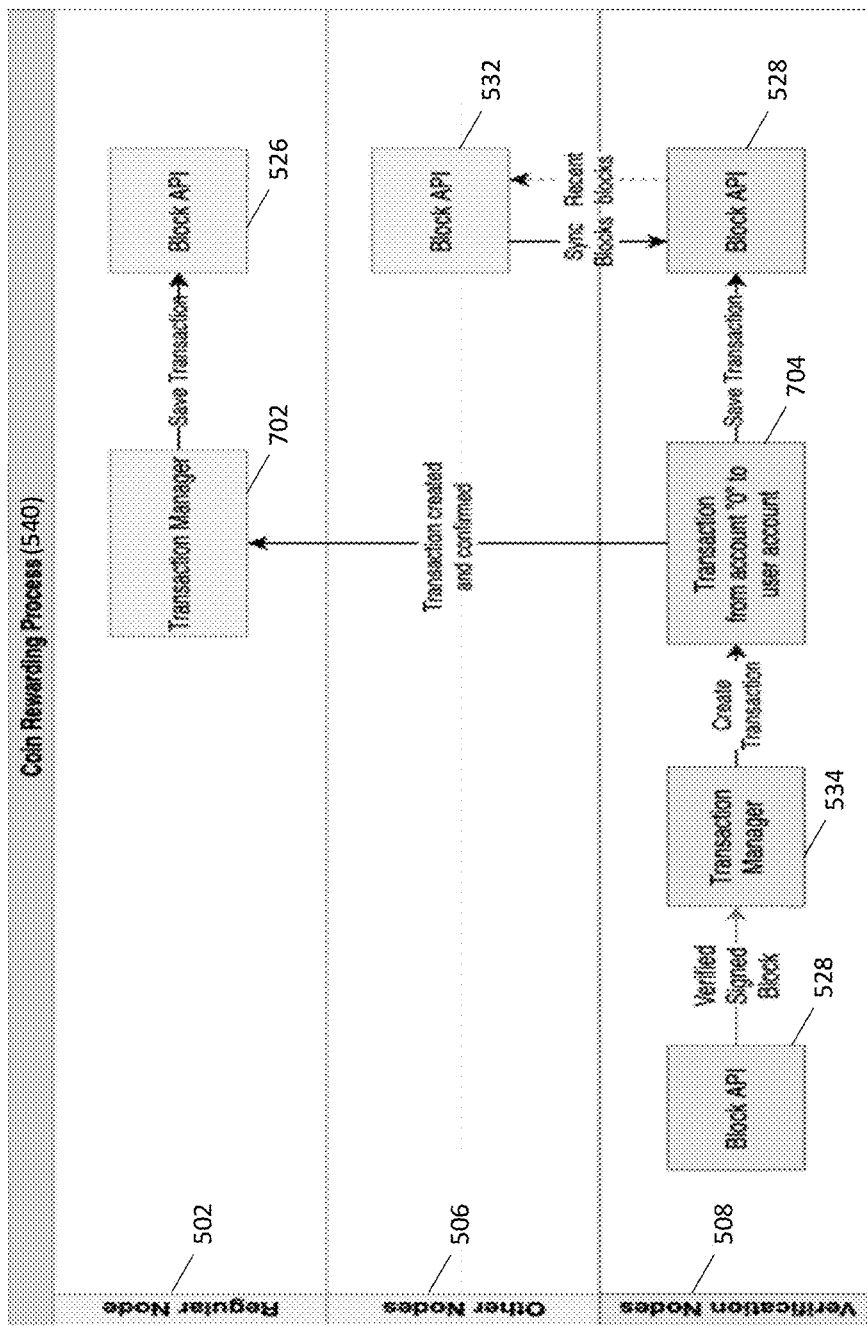
FIG. 7 illustrates a coin, token and/or asset rewarding process according to an example of the present disclosure.

FIG. 7 illustrates the coin rewarding process 540 in FIG. 5. The components that are present in FIG. 5 are given the same reference numerals in FIG. 7.

For example, the transaction manager 534 of the verification node 508 creates a transaction record 704 that is for issuing coin, token and/or asset from a user or administrative account "0" to the user account associated with the regular node 502. Upon creation of the transaction and confirmation, a transaction manager 702 of the regular node 502 takes care of the transaction (i.e., receives and stores the coin, token and/or asset) and instructs the Block API 526 to save the successful transaction record 704 to the blockchain storage or records of the regular node 502. The transaction manager 534 instructs the Block API 528 of the verification node 508 to save the successful transaction record 704 (or update and synchronize latest verified blocks) to the blockchain storage or records of the one or more verification nodes 508, and the one or more other nodes 506. The Block API 528 works with Block APIs of other verification nodes and the Block API 532 of the other nodes 506 to complete the saving and updating for these nodes.

In an example, the blockchain network described in the examples of the present disclosure can be a decentralized system and the NNBB uses open-source algorithm to validate data blocks based on a pre-trained data model. The pre-trained data model can be downloaded to each network node, so that everyone can participate in the verification of the data block.

The NNBB might not guarantee that it detects user activity within 100% or even 95% confidence interval. Typically, the confidence percentage can be much less for the first versions, maybe 50-60%, which means that only half of the users will get reward in the initial stages on the blockchain network. However, the NNBB can be configured to continuously train and improve itself. Furthermore, user behaviour during software usage (e.g., gaming behaviour in the case of game software) may change during every software (or application) update, and the NNBB should be continuously updated to adapt to such changes. The NNBB should constantly re-train using the blockchain's data. Some of nodes in the blockchain network with high-end hardware can become training nodes. They may use open blockchain data and retrain the NNBB model to become an improved version. When training is done, the training nodes may push the new version of the NNBB model to the blockchain network and voting occurs among the nodes to decide whether to implement the new version of the NNBB model.

When a new NNBB model is pushed to the blockchain by a training node, voting can commence. It can be configured that every node uses both the old blockchain using the old NNBB model, and the new blockchain using the new NNBB model, during gameplay. Validation statistics can be collected for human created and/or computer-generated data packets and blocks for a voting period, for example, a week. Alter the voting period has passed, the statistics of the results of the old and new models can be compared and the best model is chosen to be used for the blockchain network.

The criteria for comparison can be percent of correctly detected human/artificial nodes in predefined and well-known set of nodes. If 51% on notes are voted for new model it wins the election and replaces old model. When new model wins the voting at will provide better results for player action detection and this will allow network to evolve and grow. Voting can be rewarded by coins also for win model, because this will stimulate network participants to use their resources for evolving the network fast.

As the NNBB may not be 100% accurate in its assessment, a software component (e.g., an API), an apparatus and/or system may be implemented in addition to the NNBB to validate user activity. For instance, such software component, apparatus and/or system may be programmed to look out for the near duplicates as explained earlier and/or other features to confirm that there is no cheating from the user data. Such features may vary depending on the software that the user is using or in the case of game play detection, the game that the user is playing.

Figure 8:
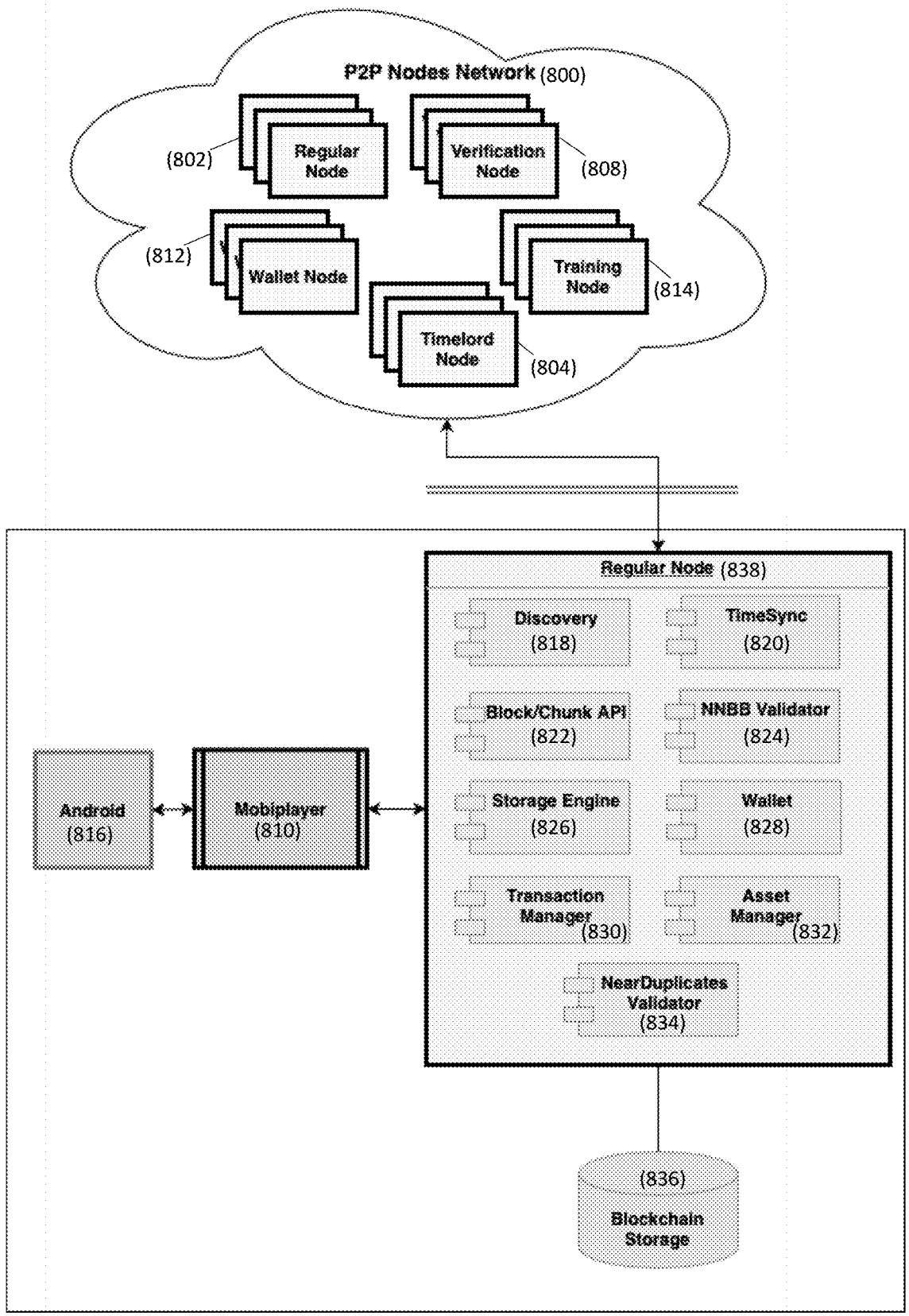
FIG. 8 illustrates a system architecture of a regular node in a blockchain network configured according to an example of the present disclosure.

FIG. 8 shows an example of a system architecture of a P2P Nodes network 800 i.e., a blockchain network described in the present disclosure.

The network 800 comprises a plurality of regular nodes 802, each similar to the regular node 502 of FIG. 5; a plurality of timelord nodes 804, each similar to each of the one or more timelord nodes 504 of FIG. 5; and a plurality of verification nodes 808, each similar to each of the one or more verification nodes 508 of FIG. 5. The regular nodes 802 are configured for users to use the network to earn assets, tokens and/or coins by using one or more pieces of software running on the regular nodes 802. The timelord nodes 804 are for performing duties of the timelord 102 described with reference to FIG. 1 earlier. The verification nodes 808 are for validating that users indeed used the one or more pieces of software running on the regular nodes 802. The network 800 can issue its own coin, token, and/or asset that can be exchanged in the network 800, and/or allow users to use an existing coin, token, and/or asset for transactions in the network 800.

The term "node" used in the present disclosure can refer to a device such as a desktop computer, smartphone, laptop, tablet device, smart television, video game console, television (TV) box (e.g., android TV box), and the like. It can also refer to a piece of software such as an Application Programming Interface (API).

In addition to the nodes in FIG. 8, there is a plurality of wallet nodes 812 in the network 800, wherein each of the wallet nodes can be a high level API used to manipulate assets, tokens, and/or coins. The wallet nodes are provided for users who want to manipulate assets, tokens, and coins, for example, to receive, give, buy, sell, and exchange assets, tokens and/or coins.

Furthermore, in the network 800, there is a plurality of training nodes 814 for training an NNBB model as described earlier. The NNBB model is used to validate user activity i.e., validate that users indeed use one or more software. These training nodes may use open blockchain data i.e., past data of validated user activity, and retrain the NNBB model to become an improved version. When training is done, the plurality of training nodes 814 may push the new version of the NNBB model to the blockchain network 800 and voting can occur among some or all of the nodes in the network 800 to decide whether to implement the new version of the NNBB model. Such training nodes 814 are not required if software or APIs (non-neural network based) are programmed and used to validate user activity.

Every regular node, verification node, training node and/or timelord node in the network 800 may comprise a wallet node so every each of them can manipulate assets, tokens, and coins. A hardware device or apparatus connected to the network 800 can be configured to act as a regular node, a verification node, a training node, a wallet node, and a timelord node. A regular node meant for users to earn assets, tokens, and/or coins by using one or more pieces of software can become a verification node, for example, by depositing or holding a certain amount of assets, tokens and/or coins.

Likewise, a regular node can also become a training node and/or timelord node if it has the computing resources for performing the tasks of the training node and/or the timelord node. The verification nodes 808, the training nodes 814, and/or the timelord nodes 804 may be compensated with assets, tokens and/or coins for performing the verification, training, and/or timelord tasks respectively.

FIG. 8 provides a closer look at the components of an example of a regular node 838 of the plurality of regular nodes 802. The regular node 838 comprises the following software components:

a) Discovery 818—A software component for finding a verification cluster (i.e., a plurality of verification nodes available for performing verification), and other nodes in the network 800. For example, the Discovery 512 and 513 in FIG. 5.

b) TimeSync 820—A software component for time synchronization among nodes in the network and for execution and/or verification of Verifiable Delay Function (VDF), which is discussed earlier. For example, the TimeSync 514 and TimeSync VDF 514 in FIG. 5. Specifically, this TimeSync component 820 is used to get the actual time hash that comes from timelord. This hash will be used in all operations related to transactions.

c) Block/Chunk API 822—A software component for creating data chunk/blocks containing verified user activity data (i.e., data showing that a user truly uses a software) and to save them as transactions in the blockchain storage. For example, the Chunk API 516 and 522, and the Block API 526 and 528 in FIG. 5.

d) Storage Engine 826—A software component for accessing records in a blockchain storage 836. This component may be used whenever a node wishes to access blockchain storage 836 to retrieve past records. Blockchain storage 836 refers to the blockchain transaction records that is shared with the nodes of the network 800.

e) NNBB Validator 824—This is a Neural Network Black Box, which verifies or validates user activity data to check whether they show that a user is truly using a software in a predefined or predetermined manner. The NNBB Validator 824 can be a software and/or a hardware component. For example, the NNBB validator 518 in FIG. 5, which is used by the regular node 502 to verify user activity data 520 and the NNBB validator 524 in FIG. 5, which is used by one of the verification nodes 508 to verify the user activity data 520. The NNBB validator 824 uses an NNBB model to determine from the user activity data whether the user indeed uses the software.

f) NearDuplicates Validator 824—This is a software component for validating near duplicates in the past records stored in the blockchain storage. For example, the NearDuplicates Validator 530 in FIG. 5, which is used by one of the verification nodes 508 to check whether there are near duplicates. Another Neural Network (or Artificial Intelligence) model different from the NNBB model used for verifying user activity data can be used for near duplicates detection.

g) Transaction Manager 830—An API for performing transaction of coins, tokens and/or assets between user addresses (or user accounts). For example, the transaction manager 702 and/or the transaction manager 534 in FIG. 7.

h) Asset Manager 832—An API for performing retrieving of, creation of, and initiating trading of, and/or initiating exchange of, customised assets and/or tokens (e.g., Non-Fungible Tokens), and for integrating with smart-contracts from other blockchains (e.g., Ethereum, Solana. Chia) to enable trading and/or exchange with nodes of such blockchains. A user may use the Asset Manager 832 to create customised assets and/or tokens for trading. The users may retrieve or withdraw coins and/or tokens (e.g., from the Wallet 828 of FIG. 8), and retrieve previously created assets for trading or exchange. Such trades may involve smart-contracts with other blockchains.

i) Wallet 828—This can refer to a wallet node which the regular node 838 comprises. The Wallet 828 is a high level API to manipulate assets, tokens and/or coins. It may be mainly used to receive and store assets, tokens and/or coins and to enable a user to withdraw stored assets, tokens and/or coins.

There is present a Mobiplayer 810, which has features similar to the mob player 510 in FIG. 5. It can be a software overlay at the regular node 838 to monitor and/or capture user activity, for example, capture images of the user using a software using a camera, taking video or snapshots of the graphical user interface of the software in use, capturing user inputs entered via keyboard, mouse, touchscreen, etc. The Mobiplayer 810 may be configured to operate in the 5 scenarios as follows:

(i) run as an application on an apparatus like a computer, such as a desktop or laptop computer (which can be Windows based. Mac-OS based or based on other Operating Systems), for monitoring and/or capturing user activities when the application being run is in use on the computer;

(ii) run as an application on an apparatus like a computer, such as a desktop or laptop computer (which can be Windows based. Mac-OS based or based on other Operating Systems), for monitoring and/or capturing user activities when another application is in use on the computer;

(iii) run as an application on an apparatus with a mobile device operating system such as Android or IOS for monitoring and/or capturing user activities when the application being run is in use;

(iv) run as an application on an apparatus with a mobile device operating system such as Android or IOS for monitoring and/or capturing user activities when another mobile application is in use; or (v) run as an emulator to emulate an operating system in an apparatus not natively configured to run applications of the operating system (e.g., a Windows based computer is typically unable to natively run Android apps without an emulator), and to monitor and/or capture user activities when the emulator runs an application.

The Mobiplayer 810 can be a piece of software or part of a piece of software that is downloadable and installable to the apparatus described in the aforementioned 5 scenarios to enable connection to the blockchain network 800 and to provide the features of the nodes described above.

The Mobiplayer 810 may also be a software overlay of an Android mobile application 816, or in other examples, another type of mobile application (e.g., an IOS application). The Android mobile application 816 may not originally have the features of the Mobiplayer 810 and the feature of the nodes in the network 800 as described above for enabling user usage of the Android mobile application 816 to be rewarded. The Android mobile application 816 can be an existing mobile application in an Appstore such as the Google Play Store but it is modified to include the Mobiplayer 810 so that user usage of the Android mobile application 816 may be rewarded. In other nodes, the Mobiplayer 810 may run as an emulator to emulate the Android operating system in for instance, a Windows Operating System desktop or laptop computer not natively configured to run Android mobile applications.

The Mobiplayer 810 may be configured to work with a computer neural network in which machine learning can be involved. This computer neural network can be of the type that involves deep learning. This computer neural network may be hosted by the apparatus with Mobiplayer 810, the one or more servers in the blockchain network 800, or one or more servers outside the blockchain network 800. Artificial Intelligence (A.I.) is used to monitor statuses and gather data from each application run by the apparatus in each of the abovementioned 5 scenarios (i) to (v). One or more A.I, models for different purposes can be provided by the computer neural network, and these one or more A.I, models can be updated during runtime or playtime of each application to further train the one or more respective A.I. model to be more accurate. The NNBB model described earlier for verifying user activity data can be one of these A.I. models. The Neural Network (or Artificial Intelligence) model different from the NNBB model can also be one of these A.I. models.

The computer neural network may make use of one A.I. model to categorise images of each application run on the apparatus. Images of each application that are run can be categorised into predetermined categories to for specific purposes. For example, if the category of the images relates to scoring, ranking or levelling of a game of a game application, the computer neural network can process the images to determine a score, ranking or level tied to the user against scores, rankings or level of other users of the same application.

For example, a number appearing in an image at a predetermined location together with other detected markers in the image can be criteria for predicting that the image falls in a category relating to "game score extraction", and after predicting that the image falls in this category, the number may be extracted as a game score (i.e., the gathered data from the contents of the improved mobile application) via, for instance, Optical Character Recognition.

If the determined category of the images relates to software abnormality, the computer neural network can process the images to determine a state of the application to troubleshoot the application. Such troubleshooting feature can help to prevent errors or trigger reporting of malfunction or abnormality, and ensure smooth use of each application being run by the apparatus.

If the determined category of the images relates to the detection of specific events in the application, the computer neural network can make use of the detected specific events to provide functionalities such as providing multi-player support, a social networking platform, and the like to the application.

For example, an image with specific image markers indicative of the end of an event can be criteria for predicting that the image falls in a category relating to "end of event", and after predicting that the image falls in this category, a status of the application can be updated as "end of event". An example of an action to perform during "end of event" could be to stop video capturing for a game session of a game application, or to deliver a predefined message to the user.

The detection of specific events in the application can also provide indication that the user is using the application in a predetermined manner. For instance, in a role-playing game application, if an avatar of a user is always stuck at a location on a map, and the user only provides movement commands to move around the same location, there is no progress in terms of meeting game goals. In this case, the detection of no progress through game events is indicative that the user is not playing the application in a manner that justifies being rewarded with coins, tokens and/or assets.

Moreover, one or more A.I. models may be used to inspect user's physical behaviour when the application being monitored is in use. In this case, a camera of the apparatus is used to capture images of the user when the user is using the application. The computer neural network can identify, for example, facial expressions including eye movements, and/or user gestures from captured images to determine whether the user is indeed using the application. User inputs to the apparatus entered via keypads, key boards, touchscreens, touchpads, mouse, joystick, console controller, and the like can be saved as well. Similarly, the computer neural network can check from the user inputs whether the user has programmed a bot to automatically use the application (for example, automatically play a game).

If the application is modified from an existing application (for example, an existing Android mobile app) and Mobiplayer 810 is added as a software overlay, the Mobiplayer 810 will be an improvement to the existing application and can provide additional functionalities to the application. For example, Mobiplayer 810 can provide a "Play-to-Earn" function i.e., play games to earn coins, tokens and/or assets to the application if it relates to a game. The same can also be implemented for non-game software or application, and the use of it can be rewarded similarly. In addition, the Mobiplayer 810 can also provide other functionalities like multi-player support, a social networking platform and the like to the application.

A first example of an A.I. prediction process facilitated by the computer neural network is as follows:
running an application to be monitored at the apparatus (e.g., running on a mobile device such as tablet devices, smartphones, laptops, desktop computer, and the like);
capturing images of the application as the application is running and operated by a user;
extracting image descriptors from each image of the captured images;
processing the extracted image descriptors to generate input to a model derived from a trained computer neural network (A.I. model);
processing output of the model to determine a category for the captured image from which the image descriptors are extracted;
extracting one or more features present in the captured image according to predetermined criteria for feature extraction for the category; and
processing the extracted one or more features to monitor a status of the improved mobile application, and/or gather data from contents of the improved mobile application, and/or determine whether the user is indeed using the application in a predetermined manner.

A second example of an A.I. prediction process facilitated by the computer neural network is as follows:
running an application to be monitored at the apparatus (e.g., running on a mobile device such as tablet devices, smartphones, laptops, desktop computer, and the like);
capturing images of the user using a camera of the apparatus as the application is running and operated by a user;

extracting image descriptors from each image of the captured images;

processing the extracted image descriptors to generate input to a model derived from a trained computer neural network (A.I. model); and processing output of the model to determine whether the user is indeed using the application.

A third example of an A.I. prediction process facilitated by the computer neural network is as follows:

running an application to be monitored at the apparatus (e.g., running on a mobile device such as tablet devices, smartphones, laptops, desktop computer, and the like);

capturing user inputs to the apparatus entered using a user input interface;

processing the user inputs to generate input to a model derived from a trained computer neural network (A.I. model); and processing output of the model to determine whether the user is indeed using the application.

One or more of the 3 examples stated above may be implemented together.

In another example, neural network may not be used and Mobiplayer 810 is configured to run the application to be monitored at the apparatus (e.g., running on a mobile device such as tablet devices, smartphones, laptops, desktop computer, and the like), capture images of the user using a camera of the apparatus as the application is running and operated by a user, and process the captured images to generate data to determine whether the user is indeed using the application. For example, the images captured may comprise user movement and/or gesture commands, which are hard to replicate exactly by a human, and a similarity check of such movement and/or gesture commands against past collected data can provide indication of whether the user is indeed using the application being monitored.

Furthermore, in another example, neural network may not be used and Mobiplayer 810 is configured to run the application to be monitored at the apparatus (e.g., running on a mobile device such as tablet devices, smartphones, laptops, desktop computer, and the like), capture user inputs to the apparatus entered using a user input interface, and process the captured user inputs to generate data to determine whether the user is indeed using the application. The user inputs may include any one or more of the following: keyboard (or other input/output device) command entry, text, sound recording, video recording, and/or user profile/account entry. These user inputs can verify whether a user is indeed engaged in use of the software. Furthermore, a similarity check against past collected data may make use of differences in such user inputs to determine whether the user is using the piece of software.

The Mobiplayer 810 can also provide a functionality to an application to enable the user of the application to access a platform to engage in multi-user interactions with one or more other users accessing the same platform through one or more other applications configured to access this common platform. Chat/Messaging capabilities can be provided by the Mobiplayer 810 to enable users to interact when they login to the platform. Trading of coins, tokens and/or assets can take place in the platform as well. Furthermore, through the aforementioned A.I. features, the monitoring of status of the application and/or gathering of data from the contents of the application can help to identify one or more specific points in the runtime of the application to push content to the application. For example, if specific image markers indicate the start or end of an event, or a specific midpoint of an event, this indication can be a specific point to enable pushing of content to the application. For example, alerts, advertisement, tips, comments, notifications, messages and/or recommendations may be displayed during the specific point during the runtime of the application.

The Mobiplayer 810 may provide a Graphical User Interface (GUI) configured to access a user wallet, which lists coins, tokens, and/or assets belonging to a user. The listing of coins, tokens, and/or assets may include coins, tokens, and/or assets that are different for different applications, and which are awarded for software usage of the different applications. In another example, it could be that the Blockchain network 800 issues the same coins, tokens and/or assets for every application. The GUI may provide access to a plurality of applications that can be awarded for software usage and a user can select to use any of the applications. The GUI can be configured to show recommended applications to the user based on the user's preference or based on predetermined system recommendations. Through the GUI, a user may select services to enroll and subscribe to, or to deactivate such services. For example, there can be a "play to earn" option to enable awarding of coins, tokens, and/or assets for software use. There can be options to take part in events, for example, join a game tournament, do online shopping, obtain information on existing/new coins, tokens and/or assets, etc. The GUI may allow a user to view and manage its profile, such as to add/change avatar, edit user details (alias, name, status etc.), view ranking status of the user, view past/pending trading transactions involving coins, tokens and/or assets, etc. The GUI may also allow a user to create smart transactions that may involve swapping, trading/exchanging and/or staking. The GUI may enable the user to perform activities associated with the Blockchain network 800.

A user's ranking can be tied to how much coins, tokens and/or assets staked by a user in the blockchain, and/or how active the user is. Different rankings can provide different user benefits. For example, there may be Bronze, Silver, Gold, Platinum and Diamond rankings. Bronze users may have used one or more pieces of software for a minimum or an average of 1 hour per day. To achieve Silver, users may require a minimum or an average of 2 hours per day. For Gold, users may require a minimum or an average of 3 hours of software use per day. For Platinum, a minimum or an average of 4 hours of software use per day and for Diamond, a minimum or an average of 5 hours of software use per day. Lower ranking users may be given lesser coin, token and/or asset rewards for software use and may not be given the right to take part in game tournaments, to have voting in the Blockchain, and/or to stake coins, tokens, and/or assets. On the other hand, higher ranking users would have better rewards for software use and the right to join events, take more actions in the Blockchain, have right to become verification or validation nodes, have right to undertake timelord duties, have right to become a training node, etc.

The GUI of the user wallet can include a list of coins, tokens and/or assets owned by a user. The coins, tokens and/or assets may belong to other blockchains. For example, cryptocurrencies such as Ethereum, Solana, Chia owned by the user can be shown, Options can be provided by the GUI to enable the user to receive, send, buy and swap coins, tokens and/or assets. Gas fees and/or coin/token exchange rates will be displayed during transactions.

The GUI can enable viewing of earnings or loss of user's coin, token and/or asset arising from trading, buying, selling, swapping, rewards from software usage (e.g., play to earn), gifts, fees earned from referral, and/or rebates, etc. The GUI can allow a user to take part in promotions, lucky draws, etc.

The GUI can provide reports, information, and/or summary specific to software use or "play to earn". For example, in the case of a piece of software, a report or record may be generated to show:
- software title;
- username tied to software (e.g., game alias or player name);
- date and/or time of software use;
- duration of software usage time recorded;
- geolocation details of device used for software usage;
- device type of the device used for software usage;
- details of the validator or verifier, which performed the validation or verification that the user indeed uses the software;
- hashed data associated with Blockchain record; and/or
- earnings amount i.e., the amount of coins, tokens and/or assets earned.

The aforementioned information may be obtained from the Blockchain records. In the case of game software, game related data may be reported, such as game score, game level, game ranking, etc. One or more reports can be generated to display historical data or information pertaining to software use or "play to earn". Furthermore, the GUI may be configured to have a report generated to show software usage records according to dates. The GUI may enable the records in the report to be sorted and/or filtered by date, time, earnings amount, device type, alphabetical order of software title, validator/verifier name, time duration of software use etc.

In one example, in addition to user accounts of the plurality of regular nodes 802 being rewarded with coins, tokens and/or assets for validated software usage, the user accounts of the plurality of timelord nodes 804, the plurality of verification nodes 808 and the plurality of training nodes 814 may also be rewarded for assisting with the timelord duties, the verification work, and/or the neural network training work respectively.

Figure 9:
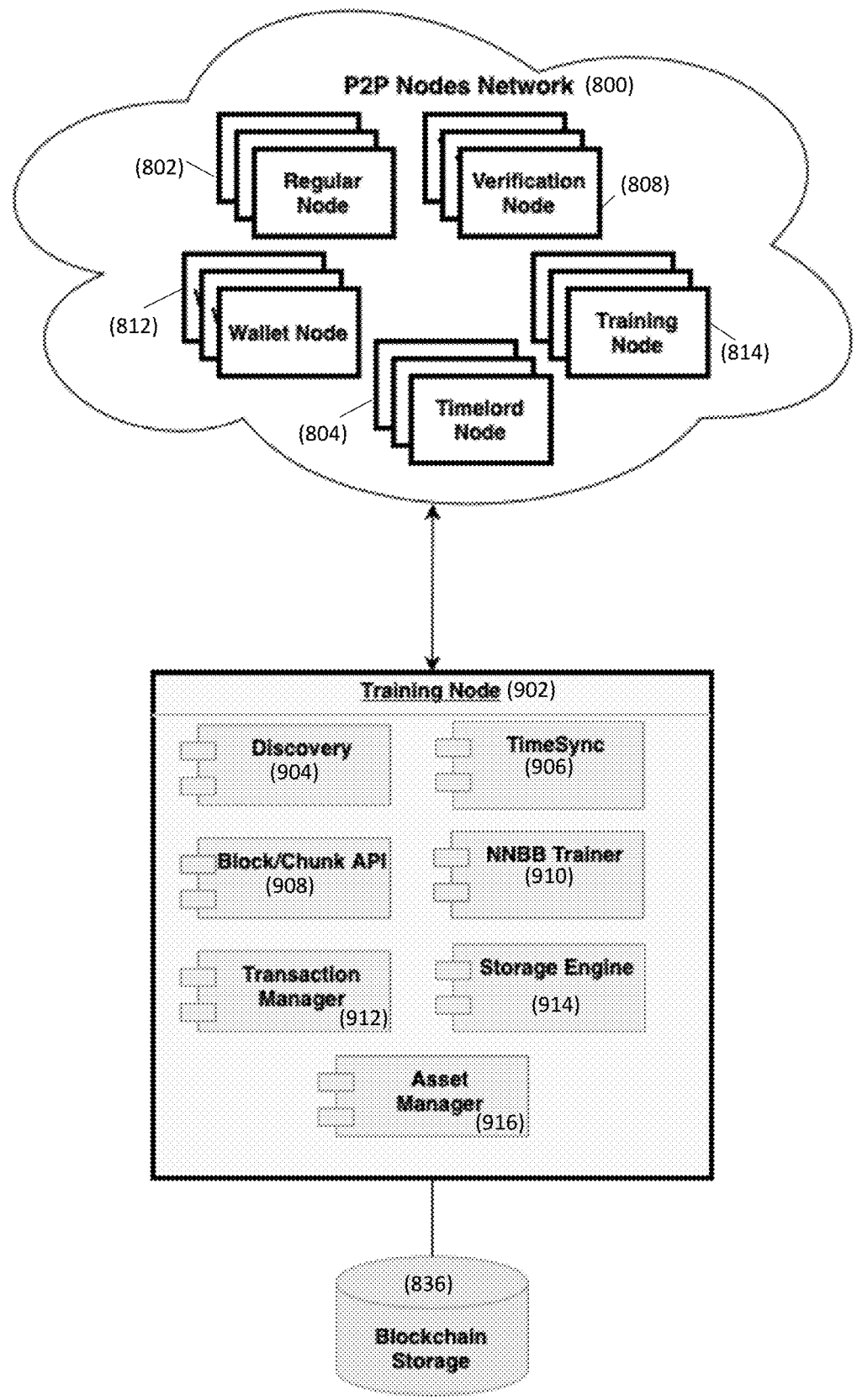
FIG. 9 illustrates a system architecture of a training node in a blockchain network configured according to an example of the present disclosure.

FIG. 9 refers to the same blockchain network 800 as FIG. 8. FIG. 9 illustrates a training node 902 of the plurality of training nodes 814 of the network 800 of FIG. 8. This training node 902 is mainly for the training of a NNBB model used in the network 800. It comprises the following software components:

a) Discovery 904—This software component allows the training node 902 to be discovered by other nodes and to allow the training node 902 to discover other nodes. Such discovery is required, for example, to search for verification nodes to vote for a new version of a neural network model, and enable such verification nodes to discover and communicate with the training node 902.

b) TimeSync 906—This software component allows the training node 902 to perform timelord related duties and time validation. The presence and use of this TimeSync component 906 is optional to the training node 902.

c) Block/Chunk API 908—This software component allows the training node 902 to perform functions similar to the Block/Chunk API 822 of FIG. 8 for training purposes.

d) Storage Engine 914—A software component for accessing data records and to store data records in the blockchain storage 836 of FIG. 8. This component may be used whenever the training node 902 wishes to access blockchain storage 836 to retrieve past records, and/or newly stored records.

e) NNBB trainer 910—This is a Neural Network Black Box trainer used to train a NNBB model used by the network 800. For example, the NNBB trainer 910 accesses records in the blockchain storage 836 using the Storage Engine 914, and uses the user activity data retrieved from the records to train the NNBB model. The training node 902 may be configured to modify the user activity data retrieved from the records to create more training sets for the training. The training node 902 may also be configured to receive and use data training sets obtained from a source external to the training node 902 for the training.

f) Transaction Manager 912—The transaction manager 912 is a software component similar to the Transaction Manager 830 of FIG. 8. The training node 902 may be rewarded for the training work done and the Transaction Manager 912 may be configured to enable such rewarding in addition to performing the duties of the Transaction Manager 830.

g) Asset Manager 916—The training node 902 may be rewarded for the training work done and the asset manager 916 is a software component similar to the Asset Manager 832 of FIG. 8 to enable such rewarding.

h) Wallet—Although a Wallet component is not drawn in FIG. 9, the training node 902 may also have a wallet software component associated with a trainer's user account that is similar to the Wallet 828 if FIG. 8 to manage rewards received by the training node 902.

The Asset Manager 832 of FIG. 8 will be further described below.

As described earlier, the Asset Manager 832 is an API for
- retrieving of (retrieve from a source and/or from the software being used),
- creation of,
- initiating trading of, and/or
- initiating exchange of,
- customised assets and/or tokens (e.g., Non-Fungible Tokens), and/or
- for integrating with smart-contracts from other blockchains (e.g., Ethereum. Solana. Chia) to enable trading and/or exchange with nodes of such blockchains.

A user may use the Asset Manager 832 to create customised assets and/or tokens (e.g., Fungible Tokens or Non-Fungible Tokens) for trading or exchange. The users may retrieve or withdraw coins and/or tokens (e.g., from the Wallet 828 of FIG. 8), and retrieve created assets for trading or exchange. Such trades may involve smart-contracts with other blockchains. The Asset Manager 832 can post trading or exchange requests by a user to a common platform accessible to other users. In this way, users can accept the trade or exchange being requested and a transaction can take place. The Asset Manager 832 may work with the Mobiplayer 810 of FIG. 8, or another software (e.g., the transaction manager 830), to enable users to access this common platform to post, cancel, or accept transaction requests.

The Transaction Manager 830 of FIG. 8 is an API for performing the transaction of coins, tokens and/or assets between user addresses (or user accounts), and it works closely with the Asset Manager 832, which initiates such transaction.

For example, each game application or software may have its own token or asset, for example, gold for in-app purchases, special weapons and/or accessories to enhance game play, a Fungible token, etc. In another example, coins, tokens and/or asset issued by the Blockchain network 800 for all applications or software can be the same.

In the case of assets that are, for example, in-app or in-game items, the app or game developers have to allow and enable such assets to be traded in the Blockchain network. However, it is expected that not all app, software, or game developer would allow or enable this. Hence, it could be that for some application or software, only assets created by a node in the Blockchain network via software associated with the Blockchain can be traded in the Blockchain network.

For instance, in the case of an android game, its tokens or assets can be labelled with a prefix "global-android-", and its game identifier (ID) in the Android application market. Coin reward rules may be customized to reward a user only with coins, tokens, and/or game asset. For example, if a user played 20 minutes of a "subway surfers" game, it can be rewarded with 20 generic coins and 20 "global-android-com.kiloo.subwaysurf" asset. Such assets can be configured to be exchangeable between gamers using the transaction manager 830.

In addition, the assets can be changed to generic coins and/or tokens at an exchange rate or price, which two users involved in the exchange think are fair. The Asset manager may have a universal API to call external smart contracts from various blockchains so that the assets can be exchanged for an external coin that is not the main coin of the blockchains network. Providers for Ethereum. Solana and Chia may be implemented by default, other providers can be implemented by third parties. The providers can do safe transactions between blockchains, for example. Ethereum. Solana. Chia or any other blockchain, which supports smart contracts and allows the use of custom smart contracts from other blockchains. Generally, a smart contract is a self-executing contract with the terms of the agreement between buyer and seller being directly written into lines of code. The code and the agreements contained therein may exist across a distributed and decentralized blockchain network.

In one example, the asset such as the 20 "global-android-com.kiloo.subwaysurf" can be a fungible token, similar to the Chia Asset Token (https://chialisp.com/docs/puzzles/cats/) which can be tied to a specific game. Whether this asset can be exchanged for in-game currency for further purchases of in-game goods or for in-app game assets is determined by the game developer. In other words, the Blockchain network can be configured to issue unique tokens or coins for each app or software, and it is up to each developer of the app or software to decide whether to make use of such tokens/coins or not. An advantage of this feature is that an app or software that is not originally tied to a Blockchain or does not have its own token or coins can be enrolled as one of the app or software that a user can be rewarded with tokens or coins unique to the app or software based on the user's usage of the software. The unique tokens or coins provide a new avenue for users of the software to trade items, which can be in-app items or any other predetermined items.

Figure 10:
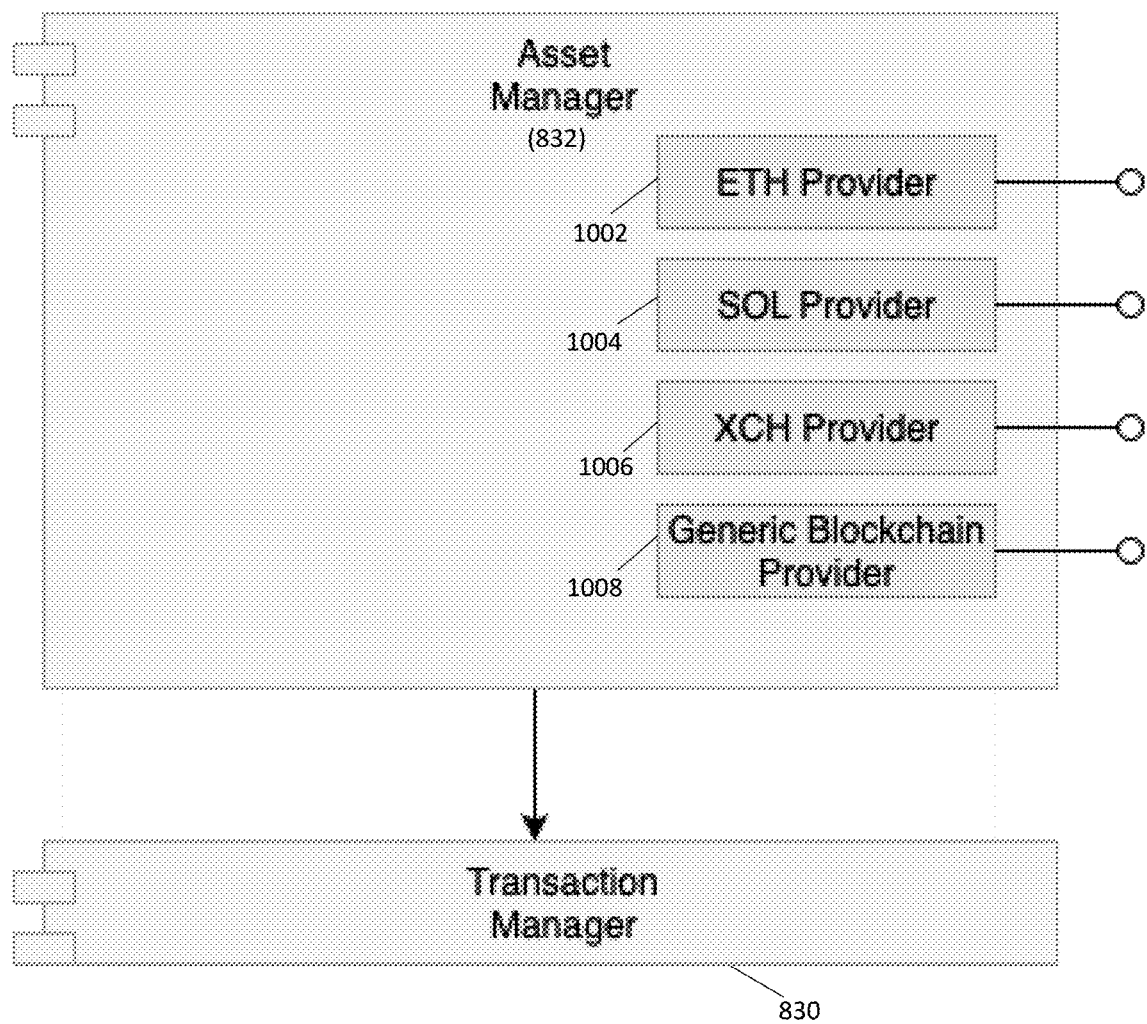
FIG. 10 illustrates software components namely an asset manager and a transaction manager configured according to an example of the present disclosure.

In the example of FIG. 10, the Asset Manager 832 is configured to have APIs or software for communicating with a plurality of blockchains. For example, the software can include an ETH provider 1002 for Ethereum network, a SOL Provider 1004 for Solana network, and a XCH Provider 1006 for Chia network. The Asset manager 832 may also be configured to comprise one or more generic blockchain Provider 1008 that can be molded for specific use cases, for example, to be configured as a provider for the blockchain of another cryptocurrency other than ETH, SOL and XCH. For example, there can also be a Blockchain provider configured for communicating with the home Blockchain network 800 of FIG. 8 for transactions relating to a unique coin, token and/or asset issued by the home blockchain network 800. In the present disclosure, each of these providers is generally a piece of software for abstracting a connection to a specific blockchain (e.g., ETH, SOL or CHIA) for executing smart contracts, and for issuing queries and sending signed state changing transactions to the specific blockchain.

An example of a transaction process using the Asset Manager 832 is described as follows with reference to FIG. 11. Specifically, FIG. 11 illustrates the transaction process in two diagrams 11A (top) and 11B (bottom). 11B is a continuation of the process shown in 11A, and "A" and "B" labelled in the 11A and 11B are continuation points of the data flow in the transaction process. The transaction process is performed in the blockchain network 800 of FIG. 8.

In the example of FIG. 11, there are two users, user 1, 1102, and user 2, 1104, being featured. User 1, 1102, wishes to exchange 10 global_android_com.kiloo.subwaysurf (hereinafter "the 10 assets") for 1 Solana (SOL) (hereinafter "the transaction W") and user 2, 1104, is willing to pay 1 SOL for the 10 global_android_com.kiloo.subwaysurf. A plurality of verification nodes 1106 are discovered by user 1, 1102, and/or user 2, 1104, through a discovery process such as Discovery 512 and 513 in FIG. 5. As explained through an earlier example, "global_android_com.kiloo.subwaysurf" is an Android game asset of a "subway surfers" game. The 10 assets may refer to 10 tokens (including Fungible or Non-Fungible Tokens), or coins, which are created in the blockchain network 800.

An apparatus of User 1, 1102, comprises a processor to execute the Asset Manager 832. The Asset Manager 832 enables the user 1, 1102, to create the transaction request to exchange 10 global_android_com.kiloo.subwaysurf for 1 Solana (SOL). In other words, the user 1, 1102, wishes to pay 1 SOL to purchase 10 global_android_com.kiloo.subwaysurf from another user. In the present example, user 1, 1102, and user 2, 1104, agreed to the transaction W without going through a common platform, and they directly contact each other (through the Asset Managers, transaction managers, Mobiplayers, or other software) to perform the transaction W. In another example, it is possible that the transaction request may be posted by the user 1, 1102, to the common platform accessible to other nodes of the blockchain network 800, and the user 2, 1104, accepted the transaction request that is posted.

An apparatus of user 2, 1104, comprises a processor to execute an Asset Manager 1112, which is configured to communicate with the Asset Manager 832, as well as to communicate with one or more Asset Managers 1110 of corresponding one or more verification nodes 1106. Apparatuses of the one or more verification nodes 1106 of the blockchain network 800 comprises one or more processors to execute the one or more Asset Managers 1110. The one or more Asset Managers 1110 comprises one or more providers (e.g., 1002, 1004, 1006 and 1008 of FIG. 10) to connect to one or more blockchains external to the blockchain network 800 for transactions involving a coin, token and/or asset of the one or more external blockchains. In this example, the Solana blockchain is involved as SOL is being exchanged, and thus the Asset Managers 832, 1110, and 1112 comprise instances of the Solana Provider 1004 of FIG. 10 for connecting to a Solana Cluster 1108 (i.e., Solana blockchain network) comprising one or more Solana nodes for performing the transaction.

In the present example, the Asset Manager 832 is used by the user 1, 1102, to initiate the transaction W to the Asset Manager 1112 of the user 2, 1104. The user 2, 1104, accepts the (asset) transaction W through the Asset Manager 1112, and upon acceptance, the created record of the transaction W is signed by the user 2, 1104, to confirm the exchange. Upon confirmation, the Asset Manager 1112 contacts an Asset Manager 1110 of the one or more verification nodes 1106 to have the transaction W executed by the one or more verification nodes 1106. For example, the Asset manager 1110 of one responsible verification node of the one or more verification nodes 1106 communicates with a Solana Program 1120 of the Solana Cluster 1108 to initiate a transaction X1 to transfer 1 SOL from a Solana account 1118 (User1 Solana Account) of the user 1, 1102, to an escrow account 1122 in the Solana Cluster 1108. The escrow account 1122 holds the 1 SOL temporarily.

If the transaction X1 is unsuccessful, the Solana Program 1120 will notify the Asset Manager 1110 that transaction is rejected, the Asset Manager 1110 will notify the Asset Manager 1112 that transaction is rejected, and the Asset Manager 1112 will notify the Asset Manager 832 that transaction is rejected.

If the transaction X1 is successful, the Solana Program 1120 continues with the transaction process by communicating the success of the transaction X1 to the Asset Manager 1110. Upon being notified of the success of transaction X1, the Asset Manager 1110 conducts a transaction X2 to transfer the 10 assets from an asset account 1114 (User2 Asset Account) of the user 2, 1104, to an asset escrow account 1116. The asset escrow account 1116 holds the 10 assets temporarily.

If the transaction X2 is unsuccessful, the Asset Manager 1110 notifies the Solana Program 1120 to revert transaction and the transaction X1 will be reversed i.e., the 1 SOL held in the escrow account 1122 is returned to the User1 Solana Account 1118. The Solana Program 1120 will also notify the Asset Manager 1110 that transaction is rejected, the Asset Manager 1110 will notify the Asset Manager 1112 that transaction is rejected, and the Asset Manager 1112 will notify the Asset Manager 832 that transaction is rejected.

If the transaction X2 is successful, the Asset Manager 1110 continues with the transaction process (see continuation point A in FIG. 11) by communicating the success of the transaction X2 to the Solana Program 1120. Upon being notified of the success of transaction X2, the Solana Program 1120 conducts a transaction Y1 to transfer the 1 SOL held in the escrow account 1122 to the User2 Asset Account 1104, and in this manner, the user 2, 1104 receives the payment of 1 SOL from the user 1, 1102.

If the transaction Y1 is unsuccessful, the Solana Program 1120 will notify the Asset Manager 1110 (see continuation point B in FIG. 11) that transaction is rejected, and the transactions X1 and X2 will be reversed accordingly. Upon notification of the rejection, the Asset Manager 1110 will in turn notify the Asset Manager 1112 that transaction is rejected, and the Asset Manager 1112 will notify the Asset Manager 832 that transaction is rejected.

If the transaction Y1 is successful, the Solana Program 1120 continues with the transaction process by communicating the success of the transaction Y1 to the Asset Manager 1110. Upon being notified of the success of transaction Y1, the Asset Manager 1110 conducts a transaction Y2 to transfer the 10 assets held in the asset escrow account 1116 to an asset account 1124 (User1 Asset Account) of user 1, 1102, and in this manner, the user 1, 1102 receives the 10 assets purchased from the user 2, 1104.

If the transaction Y2 is unsuccessful, the Asset Manager 1110 will notify the Solana Program 1120 to revert the transactions, and the transactions Y1, X1 and X2 will be reversed accordingly. The Asset Manager 1110 will also notify the Asset Manager 1112 that transaction is rejected, and the Asset Manager 1112 will notify the Asset Manager 832 that transaction is rejected.

If the transaction Y2 is successful, the Asset Manager 1110 will confirm the success of the transaction Y2 and/or W to the Asset Manager 1112. Upon being notified of the success of transaction Y2 and/or W, the Asset Manager 1112 in turn notifies the Asset Manager 832 of the success of transaction Y2 and/or W. In this manner, the transaction W is completed. Optionally, the transactions X2, Y2 and/or W can be stored as one or more records in the blockchain network 800 with the help of a software component, which can be an API. The transactions X1 and Y1 occurring in the Solana Cluster 1108 can be stored as a record in the Solana Blockchain.

Although the Solana blockchain is featured in the example of FIG. 11, it is appreciated that a similar transaction process can take place in the case that a coin or token of another blockchain is involved and of course, the process will take place in accordance with the protocol of the blockchain.

The one or more models of the neural network and the NNBB described earlier can be configured to continuously train and improve itself. The training can be conducted using the one or more training nodes 814 of FIG. 8 and/or the training node 902 of FIG. 9. As mentioned earlier, user behaviour during software usage (e.g., gaming behaviour in the case of game software) may change during every software (or application) update, and so each model of the neural network for determining software usage by users should be continuously updated to adapt to such changes. The model should constantly be re-trained using the blockchain's data (i.e., collected data during software usage) stored in the blockchain's storage (e.g., the blockchain storage 836 of FIG. 8). The nodes in the blockchain network with high-end hardware can become the training nodes. When training is done, the training nodes may push the new version of a neural network model to the blockchain network and voting occurs among the nodes to decide whether to implement the new version of the neural network model.

Figure 12:
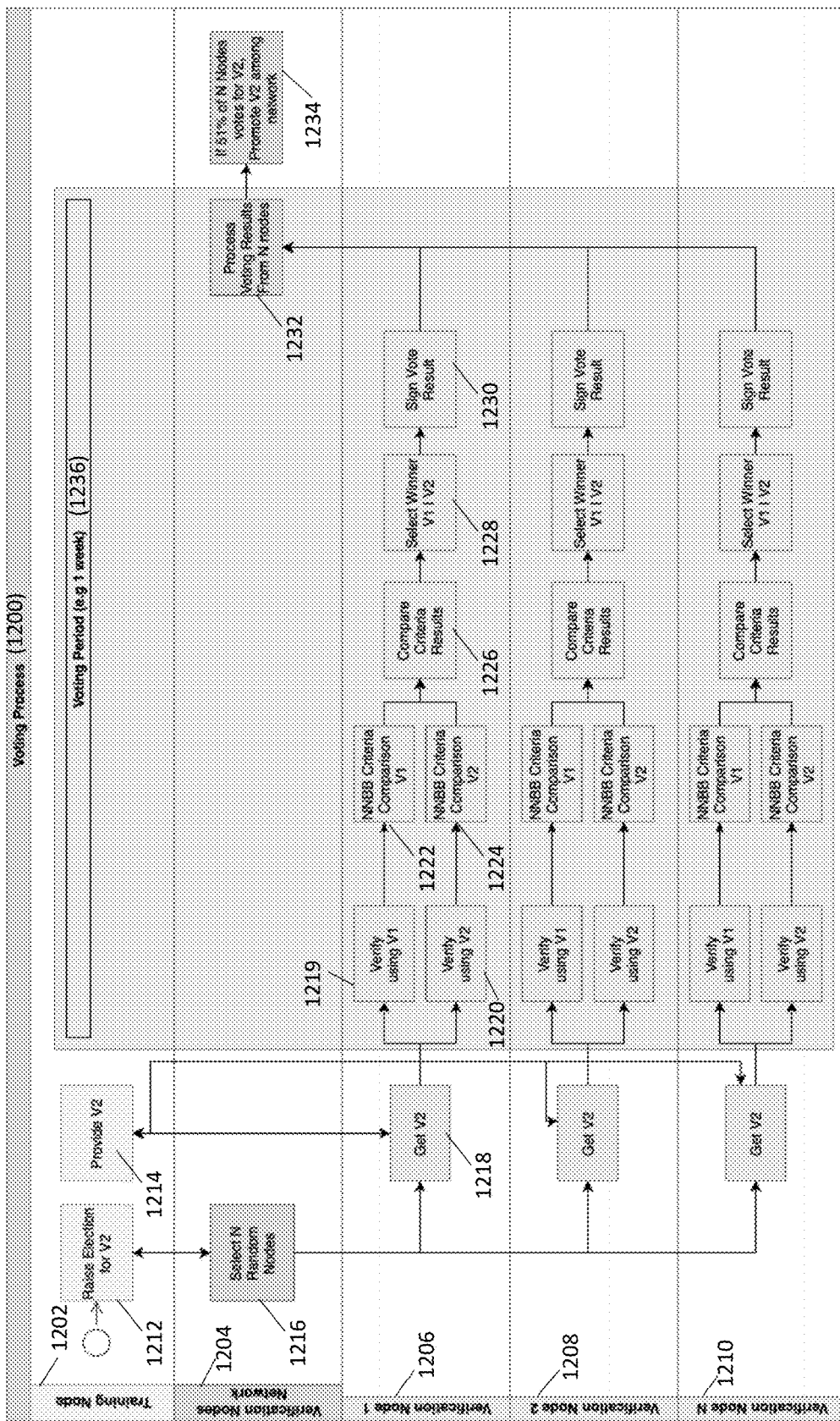
FIG. 12 illustrates a voting process of a blockchain network configured according to an example of the present disclosure for voting the implementation of new or old neural network model.

FIG. 12 shows an example of a voting process 1200 occurring in a blockchain network (e.g., 800 in FIGS. 8 and 9) to decide whether to implement a new version of the neural network model, V2. V2 is an updated version of an existing neural network model, V1, used in the blockchain network.

For this example, there are a plurality of training nodes 1202 in the blockchain network, a network of verification nodes 1204, and 3 specific verification nodes 1206, 1208 and 1210 representing a first verification node, a second verification node and an nth verification node in the network of verification nodes 1204.

Periodically or after every software update, an election is raised or initiated by one or more of the plurality of training nodes 1202 at a step 1212, and N verification nodes of the plurality of verification nodes 1204 may be selected at a step 1216 to perform the voting process 1200. For example, the N verification nodes may be selected randomly. The updated model V2 is provided at a step 1214 by the one or more of the plurality of training nodes 1202 to the one or more selected verification nodes 1204. In the present example, the 3 verification nodes 1206, 1208, and 1210 are the ones receiving or getting the updated model V2 from the one or more of the plurality of the training nodes 1202 at a step 1218. Each selected verification node conducts the voting process 1200 within a voting period (e.g., 1 week).

After getting the updated model V2, each selected verification node begins a process to verily the existing model V1 at a step 1219 and the updated model V2 at a step 1220. NNBB criteria comparison for V1 is conducted at a step 1222 and NNBB criteria comparison for V2 is conducted at a step 1224. The criteria comparison results of V1 and V2 from steps 1222 and 1224 respectively are compared at a step 1226 and the better performing model will selected or voted as "winner" by the verification node. Step 1226 can be conducted at the end of the voting period. If the winner is V2, the blockchain will be updated to implement the use of V2. If the winner is V1, no change to the blockchain is required. The criteria comparison may involve providing sample, present data, and/or past data as inputs to V1 and V2, and analysing the outputs from V1 and V2. The criteria comparison may be conducted continuously during the voting period and a final result is calculated from many instances of comparison for each of V1 and V2 before the winner selection step of 1226 is performed. The comparison may involve use of newly collected data from user nodes (such as the regular nodes 802 of FIG. 8 and FIG. 9) that send collected data on software usage to be validated to get a reward. The sample, present data, and/or past data used may be the same, different, or randomly selected between the selected verification nodes. Once the winner is determined, each verification node digitally signs the voting result. At a step 1232, one or more selected verification nodes of the network of verification nodes 1204 then processes the voting results collated from N number of voting verification nodes such as from verification nodes 1206, 1208 and 1210. At a step 1234, the collated voting results are checked. If for example, at least 51% of the N number of voting verification nodes vote for V2, V2 will then be "promoted" or replace V1 as the model to be used for the blockchain network.

The steps 1219 to 1230 taken by each selected verification node (e.g., verification nodes 1206, 1208, and 1210) are the same during the voting period and these steps apply to each selected verification node. For convenience, the reference numerals for the steps 1219 to 1230 are only provided for verification node 1206 in FIG. 12 and omitted for verification nodes 1208 and 1210.

Details of an example applicable to the apparatus and/or the server described in all the examples of the present disclosure, and/or applicable to each hardware node of the blockchain network (e.g., 800 in FIG. 8), is as follows. The apparatus and/or each hardware node of the present example may be a user or client device and can communicate with one or more user or client device and/or one or more servers via the Internet. The apparatus and/or each hardware node may be a personal computer, a server computer (in short "server"), a desktop computer, a video game console, a smart television (TV), a TV box or similar device (e.g., android box), a portable or laptop computer, a smartphone, a tab or pad device, and the like. The apparatus of the present example may have one or more of the following components in electronic communication via a bus:

1. a display;
2. non-volatile memory;
3. random access memory ("RAM");
4. N processing components ("one or more processors");
5. a transceiver component that includes N transceivers;
6. user controls i.e., user input devices;
7. optionally, image capturing components (e.g., camera);
8. optionally, audio signal capturing components;
9. optionally, audio speakers; and
10. Input/Output interfaces for connecting to the user input devices (such as mouse, joystick, keyboard, sensors for detecting user gestures, and the like), the audio speakers, image capturing components and/or audio signal capturing components.

The display generally operates to provide a presentation of graphical content (e.g., graphical contents of the mobile device software, the one or more links, announcements and/or advertisements herein described) to a user, and may be realized by any of a variety of displays (e.g., CRT, LCD, HDMI, micro-projector and OLED displays). The display may be a touchscreen and considered as one of the Input/Output interfaces as it is able to receive user inputs.

In general, the non-volatile memory functions to store (e.g., persistently store) data and executable code, instructions, program or software including code, instructions, program or software that is associated with the functional components of a browser component and applications. In one example, the code, instructions, program or software may provide an emulator for running mobile applications, if the operating system of the apparatus is not natively configured to run mobile applications. In some examples, the code, instructions, program or software may include bootloader code, modem software, operating system code, file system code, and code to facilitate the operation of the apparatus as well as other components well known to those of ordinary skill in the art that are not depicted for simplicity. The code, instructions, program or software may provide software to enable the apparatus, server and/or each hardware node to participate as a node with predefined functionalities in a blockchain network.

In many implementations, the non-volatile memory is realized by flash memory (e.g., NAND or NOR memory), but it is certainly contemplated that other memory types may be utilized as well. Although it may be possible to execute the code from the non-volatile memory, the executable code in the non-volatile memory is typically loaded into RAM and executed by one or more of the N processing components.

The N processing components (or "one or more processors") in connection with RAM generally operate to execute the instructions stored in non-volatile memory to effectuate the functional components. As one skilled in the art (including ordinarily skilled) will appreciate, the N processing components may include a video processor, modem processor, DSP, graphics processing unit (GPU), and other processing components. In some implementations, the processing components are configured to determine a type of software activated on the apparatus.

The transceiver component may include N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS networks, 5G network etc.), and other types of communication networks. In some implementations, the communication of the transceiver component with communication networks enables a location of the apparatus to be determined.

The image capturing components and the audio signal capturing components that are optionally available can also be utilised to input user controls, as defined control settings.

The processing of the executable code, instructions, program or software may be performed in parallel and/or sequentially. The executable code, instructions, program or software may be stored on any machine or computer-readable medium that may be non-transitory in nature. The computer readable medium may include storage devices such as magnetic or optical disks, memory chips, or other storage devices suitable for interfacing with a computer or mobile device. The machine or computer readable medium may also include a hard-wired medium, or wireless medium. The executable code, instructions, program or software when loaded and executed effectively results in the apparatus that implements steps of methods in examples herein described.

Examples of the present disclosure may have the following features.

A method for validating software usage on an apparatus (e.g., 302 in FIG. 3, each node of 502, 504, 506, and 508 in FIG. 5, and each node of 802, 804, 808, 812, and 814 in FIG. 8), the method comprising:

- collecting data when a piece of software is running on an apparatus connected to a network (e.g., 800 in FIG. 8) and the piece of software is being used by a user, wherein the collected data includes data indicative of one or more user activities;
- periodically (the time period may or may not be substantially constant) generating a data packet (e.g., 200 of FIG. 2) containing the data collected when the piece of software is running to obtain a plurality of the data packets;
- verifying that each data packet is generated according to predetermined rules governing the periodic generation of each data packet;
- checking the collected data contained in a plurality of verified data packets to determine whether the user is using the software during the time of collection of the collected data; and
- checking whether the checked collected data contained in the plurality of the verified data packets have similarity with past collected data that exceeds a predetermined level of similarity,
- wherein software usage by a user is deemed to be validated if it is determined that the user is using the software and no past collected data exceeding the predetermined level of similarity is found. In one example, the past collected data may be stored in a database and the database may, for example, be a Blockchain storage for storing Blockchain records.

The method may comprise:

- assembling the plurality of data packets to create a data block (e.g., 402 in FIG. 4),
- wherein the collected data subjected to the similarity check against past collected data are collected data contained in the data block.

During the similarity check against past collected data stored in the database, the method may comprise:

- encoding the collected data contained in the data block to obtain a string sequence; and
- comparing the string sequence with a plurality of string sequences obtained from the past collected data to determine a degree of similarity between the string sequence and each of the plurality of string sequences obtained in the past collected data,
- wherein software usage by the user is not validated if the degree of similarity between the string sequence and each of the plurality of string sequences obtained in the past collected data exceeds the predetermined level of similarity. The string sequence may be a string sequence or data sequence that has been subjected to hashing (i.e., hash of string sequence or data sequence).

The network may be a blockchain network, and the method may comprise:

- awarding coins, tokens and/or assets to a user account of the user according to amount of time of the software usage after validation of the software usage by the user. In the case that the network is a blockchain network, the past collected data will be the records of the Blockchain.

The method may comprise:

- using one or more blockchain providers (e.g., 1002, 1004, 1006 and 1008) to enable transactions involving coins, tokens and/or assets to take place across different blockchains, wherein each blockchain provider is associated with one or more cryptocurrency.

The coins, tokens and/or assets to be awarded for software usage of the piece of software may be configured to be associated with the piece of software and different from coins, tokens and/or assets being awarded for software usage of the other software.

The method may comprise:

- sending the collected data contained in the plurality of the verified data packets to a neural network (e.g., 518 and 524 in FIG. 5, and 824 in FIG. 8) to determine whether the user is using the piece of software within a time frame associated with the collected data contained in the plurality of the verified data packets.

The method may comprise:

- capturing images of the piece of software as it is running on the apparatus;
- extracting image descriptors from each image of the captured images;
- processing the extracted image descriptors to generate input to a first model of the neural network;
- processing output of the first model to determine a category for the captured image from which the image descriptors are extracted;
- extracting one or more features present in the captured image according to predetermined criteria for feature extraction for the category; and
- processing the extracted one or more features to determine whether the user is using the piece of software.

For example, in the case that the piece of software is a game, the images may include images of game data such as scores and/or game level information. The game scores and game level information can verify whether a user is indeed engaged in the game play for the game. Furthermore, the similarity check against past collected data described earlier may make use of differences in scores and/or game level information to determine whether the user is using the piece of software.

The method may comprise:

- capturing images of the user using a camera of the apparatus as the piece of software is running; and
- processing the captured images to generate data to determine whether the user is using the piece of software.

Optionally, a model of a neural network may be used to determine whether the user is using the piece of software from the generated data. In this case, the method may comprise: capturing images of the user using a camera of the apparatus as the piece of software is running;

- extracting image descriptors from each image of the captured images;
- processing the extracted image descriptors to generate input to a second model of the neural network; and
- processing the output of the second model to determine whether the user is using the piece of software.

For example, the images captured may comprise user movement and/or gesture commands.

The method may comprise:
capturing user inputs entered using a user input interface of the apparatus;
processing the user inputs to generate data to determine whether the user is indeed using the piece of software.

Optionally, a model of a neural network may be used to determine whether the user is using the piece of software from the generated data. In this case, the method may comprise:
capturing user inputs entered using a user input interface of the apparatus;
processing the user inputs to generate input to a third model of the neural network; and
processing the output of the third model to determine whether the user is indeed using the application.

The user inputs may include any one or more of the following: keyboard (or other input/output device such as mouse, joystick, game controller etc.) command entry, text, sound recording, video recording, and/or user profile/account entry. These user inputs can verify whether a user is indeed engaged in use of the software. Furthermore, a similarity check against past collected data may make use of differences in such user inputs to determine whether the user is using the piece of software.

The method may comprise:
capturing user heat emission profile via one or more thermal sensors; and
processing the user heat emission profile to generate data to determine whether the user is using the piece of software.

The user heat emission profile (i.e., heat emission changes of a user over time) is expected to be unique in every instance of software usage, and almost impossible to replicate. User heat emission profile can also be known as user temperature profile, heat profile or user thermal profile. It can be used as a primary or secondary consideration to determine whether the user is using the piece of software. Optionally, a model of a neural network may be used to determine whether the user is using the piece of software from the generated data. Detection of user heat emission profile for a predetermined and/or substantial time duration can verify whether a user is indeed engaged in use of software. Furthermore, the similarity check against past collected data described earlier may make use of differences in user heat emission profile to determine whether the user is using the piece of software. An example of a thermal sensor is an infrared thermal sensor.

The method may comprise:
obtaining data about user or device location, motion, positioning and/or orientation as one or more parameters to determine whether the user is using the piece of software. The similarity check against past collected data described earlier may make use of differences in user location, positioning and/or orientation to determine whether the user is using the piece of software. For instance, with regard to location and/or positioning, a Global Positioning System (GPS) sensor may be used. Location may also be detected via WiFi positioning, the telecommunication network (cellular positioning) and/or via the internet (e.g., through use of IP address, browser geolocation, etc.). With regard to orientation detection, for example, a gyrometer and/or magnetometer may be used. With regard to motion (vibration) detection, for example, an accelerometer may be used. In particular, user or node (i.e., user device) motion and/or orientation is expected to be unique and hard to replicate. For example, detection of motion, and/or orientation may be primary or secondary considerations in the determination of whether the user is using the piece of software. Location (e.g., geolocation) and/or positioning (e.g., height, depth, or coordinates within a specific area or relative to a map of a specific area) can be additionally included as secondary considerations in the determination of whether the user is using the piece of software.

In the case that the network is a blockchain network, the method may comprise:
training an existing model of the neural network to produce an updated model; and
subjecting the updated model to voting in the blockchain network,
wherein whether the updated model is to be implemented for the blockchain network depends on a final result of the voting,
wherein during the voting, comparison between the existing model and the updated model is conducted by one or more nodes in the blockchain network and each node produces a vote to be collated for determining the final result of the voting.

The method may comprise:
sequentially hashing each of the plurality of data packets in chronological order as each data packet is generated, wherein time period between the hashing of every two consecutively generated data packets is substantially constant. "Substantially constant" means that the time period may not be exactly constant but would lie in certain intervals and these intervals may not differ much from a constant. These intervals are dependent on, for instance, the spread in sequential hash rate on different types of hardware. The deviations between modern fast enterprise hardware and the standard high end computing hardware is expected to be a small percentage.

The method may comprise:
electronically or digitally signing each data packet with a signature associated with the user to enable the signed data packet to be authenticated. For example, the data packet may be signed for subsequent authentication (which may include verification and unambiguous comparison) of a data packet with an address in the blockchain (i.e., a record stored in the blockchain associated with and/or containing the data of the data packet), so that there is no falsification of other party's data.

Whether the user is actively using the piece of software and not idling may be considered during the determination of whether the user is using the software.

An apparatus (e.g., 302 in FIG. 3, each node of 502, 504, 506, and 508 in FIG. 5, and each node of 802, 804, 808, 812, and 814 in FIG. 8) for validating software usage, the apparatus comprises:
a processor for executing instructions stored in a memory to operate the apparatus to:
collect data when a piece of software is running on the apparatus and the piece of software is being used by a user, wherein the collected data includes data indicative of one or more user activities;
periodically (the time period may or may not be substantially constant) generate a data packet (e.g., 200 of FIG. 2) containing the data collected when the piece of software is running to obtain a plurality of the data packets;

sending each data packet for verification to verify that the data packet is generated according to predetermined rules governing the periodic generation of the data packet;

sending a plurality of the verified data packet for
checking that the collected data contained in the plurality of the verified data packet determine whether the user is using the software during the time of collection of the collected data, and for checking whether the checked collected data contained in the plurality of the verified data packet have similarity with past collected data that exceeds a predetermined level of similarity, wherein software usage by a user is deemed to be validated if it is determined that the user is using the software and no past collected data exceeding the predetermined level of similarity is found. In one example, the past collected data may be stored in a database and the database may, for example, be a Blockchain storage for storing Blockchain records.

The apparatus may be operable to:
assemble the plurality of data packets to create a data block (e.g., 402 of FIG. 4), wherein the collected data contained in the plurality of the verified data packet to be subjected to the similarity check against past collected data are the collected data contained in the data block.

During the similarity check against past collected data,
the collected data contained in the data block may be encoded to obtain a string sequence; and the string sequence may be compared with a plurality of string sequences obtained from the past collected data to determine a degree of similarity between the string sequence and each of the plurality of string sequences obtained in the past collected data, wherein software usage by the user is not validated if the degree of similarity between the string sequence and each of the plurality of string sequences obtained in the past collected data exceeds the predetermined level of similarity. The string sequence may be a string sequence or data sequence that has been subjected to hashing (i.e., hash of string sequence or data sequence).

The apparatus may comprise a network connector for connecting to a blockchain network, and coins, tokens and/or assets may be awarded to a user account of the user according to amount of time of the software usage after validation of the software usage by the user.

The apparatus may be operable to:
use one or more blockchain providers to enable transactions involving coins, tokens and/or assets to take place across different blockchains, wherein each blockchain provider is associated with one or more cryptocurrency.

The coins, tokens and/or assets to be awarded for software usage of the piece of software may be configured to be associated with the piece of software and different from coins, tokens and/or assets being awarded for software usage of the other software.

The collected data contained in the plurality of the verified data packet may be sent to a neural network to determine whether the user is using the piece of software within a time frame associated with the collected data contained in the plurality of the verified data packet.

The apparatus may be operable to:
capture images of the piece of software as it is running; and subject each image of the captured images to processing (e.g., by the processor of the apparatus or by a processor of another apparatus) to extract image descriptors from the image, wherein the extracted image descriptors are to be processed to generate input to a first model of the neural network to produce an output, and the output of the first model is to be processed to determine a category for the captured image from which the image descriptors are extracted, wherein one or more features present in the captured image extracted according to predetermined criteria for feature extraction for the category, and the extracted one or more features are to be processed to determine whether the user is using the piece of software.

The apparatus may comprise:
a camera for capturing images of the user as the piece of software is running; and the apparatus may be operable to:
subject each image of the captured images to processing (e.g., by the processor of the apparatus or by a processor of another apparatus) to generate data to determine whether the user is using the piece of software.

Optionally, a model of a neural network may be used to determine whether the user is using the piece of software from the generated data. In this case, the apparatus may be operable to:

subject each image of the captured images to processing (e.g., by the processor of the apparatus or by a processor of another apparatus) to extract image descriptors from the image, wherein the extracted image descriptors are to be processed to generate input to a second model of the neural network to produce an output, and the output of the second model is to be processed to determine whether the user is using the piece of software.

For example, the images captured may comprise user movement and/or gesture commands.

The apparatus may comprise a user input interface, and the apparatus may be operable to:
capture user inputs entered using the user input interface; and subject the user inputs to processing (e.g., by the processor of the apparatus or by a processor of another apparatus) to generate data to determine whether the user is using the piece of software.

Optionally, a model of a neural network may be used to determine whether the user is using the piece of software from the generated data. In this case, the apparatus may be operable to:

capture user inputs entered using the user input interface; and subject the user inputs to processing (e.g., by the processor of the apparatus or by a processor of another apparatus) to generate input to a third model of the neural network to produce an output, wherein the output of the third model is to be processed to determine whether the user is indeed using the piece of software.

The user inputs may include any one or any combination of the following: keyboard (or other input/output device such as mouse, joystick, game controller etc.) command entry, text, sound recording, video recording, and/or user profile/account entry, and user biometric data entry (e.g., fingerprint, eye profile entry etc). These user inputs can verify whether a user is indeed engaged in use of the software. Furthermore, the similarity check against past collected data described earlier may make use of differences in such user inputs to determine whether the user is using the piece of software.

The apparatus may be operable to:
capture user heat emission profile via one or more thermal sensors; and
process the user heat emission profile to generate data to determine whether the user is using the piece of software.

The user heat emission profile (i.e., heat emission changes of a user over time) is expected to be unique in every instance of software usage, and almost impossible to replicate. User heat emission profile can also be known as user temperature profile, heat profile or user thermal profile. It can be used as a primary or secondary consideration to determine whether the user is using the piece of software. Optionally, a model of a neural network may be used to determine whether the user is using the piece of software from the generated data. Detection of user heat emission profile for a predetermined and/or substantial time duration can verify whether a user is indeed engaged in use of software. Furthermore, the similarity check against past collected data described earlier may make use of differences in user heat emission profile to determine whether the user is using the piece of software. An example of a thermal sensor is an infrared thermal sensor The apparatus may be operable to:
obtain data about user or device location, motion, positioning and/or orientation as one or more parameters to determine whether the user is using the piece of software. The similarity check against past collected data described earlier may make use of differences in user location, positioning and/or orientation to determine whether the user is using the piece of software. For instance, with regard to location and/or positioning, a Global Positioning System (GPS) sensor may be used. Location may also be detected via Wi-Fi positioning, the telecommunication network (cellular positioning) and/or via the internet (e.g., through use of IP address, browser geolocation, etc.). With regard to orientation detection, for example, a gyrometer and/or magnetometer may be used. With regard to motion (vibration) detection, for example, an accelerometer may be used. In particular, user or node (i.e., user device) motion and/or orientation is expected to be unique and hard to replicate. For example, detection of motion, and/or orientation may be primary or secondary considerations in the determination of whether the user is using the piece of software. Location (e.g., geolocation) and/or positioning (e.g., height, depth, or coordinates within a specific area or relative to a map of a specific area) can be additionally included as secondary considerations in the determination of whether the user is using the piece of software.

In the case that the apparatus is connected to a blockchain network, and an existing model of the neural network may be subjected to training to produce an updated model,
wherein the updated model may be subjected to voting in the blockchain network,
wherein whether the updated model is to be implemented for the blockchain network depends on a final result of the voting,
wherein during the voting, comparison between the existing model and the updated model is to be conducted by one or more nodes in the blockchain network and each node produces a vote to be collated for determining the final result of the voting.

The apparatus may be operable to:
subject each of the plurality of data packets to sequential hashing (e.g., by the processor of the apparatus or by a processor of another apparatus) in chronological order as each data packet is generated, wherein time period between the hashing of every two consecutively generated data packets is substantially constant. The meaning of "substantially constant" is the same as that defined above.

The apparatus may be operable to:
electronically or digitally sign each data packet with a signature associated with the user to enable the signed data packet to be authenticated. For example, the data packet may be signed for subsequent authentication (which may include verification and unambiguous comparison) of a data packet with an address in the blockchain (i.e., a record stored in the blockchain associated with and/or containing the data of the data packet), so that there is no falsification of other party's data.

Whether the user is actively using the piece of software and not idling may be considered during the determination of whether the user is using the software.

The collected data at the abovementioned apparatuses may include a sound and/or video recording of the user using the software. For example, such sound and/or video recording can be processed (with use of neural network or not) to determine that the user is using the software in a predetermined manner, and/or determine that the user is indeed using the software.

The video recording may be used to capture one or more user gestures, track user eye, and/or facial expressions, which is to be processed to determine that the user is using the software in a predetermined manner, and/or determine that the user is indeed using the software. For example, the captured user gestures/expressions can show that the user is seriously playing a game and not just fooling around to earn rewards.

The collected data at the abovementioned apparatuses may include data of verified biometric information of the user. For example, the user may be requested to verify fingerprint on a device and the device generates data verifying that the fingerprint belongs to the user. Such data can help to verify that the user is indeed present to use the software.

The collected data at the abovementioned apparatuses may include key presses, touchscreen inputs, commands and/or text entered by the user and time of entry of these key presses, touchscreen inputs, commands and/or text, wherein the time of entry is a factor to distinguish between different instances of software usage. For example, in the case of a software that requires users to enter identical or substantially similar inputs during each instance of software usage, the time of entry can help to distinguish each instance of software usage from other instances of software usage. Although the user inputs can be identical or substantially similar in each instance of software usage, it is difficult for users to replicate the same time of entry of the user inputs.

The collected data at the abovementioned apparatuses may include a photograph or a snapshot taken by the user using the apparatus, which is to be processed to determine that the user is present and/or using the software in a predetermined manner. For example, face recognition can be performed to verify that a user associated with a user account is indeed present to use the software. In another example, the user may be prompted to take certain user actions, including taking a photograph and/or a snapshot, to show presence, to show that the user is engaged in active software usage, and/or the user is using the software in a predetermined manner.

In the above description, many methods are disclosed to capture user activity data, so as to show presence of user, show that the user is engaged in active software usage, determine that the user is using the software in a predetermined manner, and/or determine that the user is indeed using the software. It should be appreciated that any one or any combination of the aforementioned methods can be adopted to provide for different types of software. Some methods may be more accurate for some software compared to other methods.

In the specification and claims, unless the context clearly indicates otherwise, the term "comprising" has the non-exclusive meaning of the word, in the sense of "Including at least" rather than the exclusive meaning in the sense of "consisting only of". The same applies with corresponding grammatical changes to other forms of the word such as "comprise", "comprises" and so on.

While the invention has been described in the present disclosure in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

The invention claimed is:

1. A method for validating software usage on an apparatus, the method comprising:
   collecting data when a piece of software is running on an apparatus connected to a network and the piece of software is being used by a user, wherein the collected data includes data indicative of one or more user activities;
   periodically generating a data packet containing the data collected when the piece of software is running to obtain a plurality of the data packets;
   verifying that each data packet is generated according to predetermined rules governing the periodic generation of each data packet;
   checking the collected data contained in a plurality of verified data packets to determine whether the user is using the software during the time of collection of the collected data;
   checking whether the checked collected data contained in the plurality of the verified data packets have similarity with past collected data that exceeds a predetermined level of similarity; and
   sending the collected data contained in the plurality of the verified data packets to a neural network to determine whether the user is using the piece of software within a time frame associated with the collected data contained in the plurality of the verified data packets,
   wherein software usage by a user is deemed to be validated if it is determined that the user is using the software and no past collected data exceeding the predetermined level of similarity is found,
   wherein the network is blockchain network and the method further comprises:
   training an existing model of the neural network to produce an updated model; and
   subjecting the updated model to voting in the blockchain network,
   wherein whether the updated model is to be implemented for the blockchain network depends on a final result of the voting.

2. The method as claimed in claim 1, wherein the method comprises:
   assembling the plurality of data packets to create a data block,
   wherein the collected data subjected to the similarity check against past collected data are collected data contained in the data block.

3. The method as claimed in claim 2, wherein during the similarity check against past collected data, the method comprises:
   encoding the collected data contained in the data block to obtain a string sequence; and
   comparing the string sequence with a plurality of string sequences obtained from the past collected data to determine a degree of similarity between the string sequence and each of the plurality of string sequences obtained in the past collected data,
   wherein software usage by the user is not validated if the degree of similarity between the string sequence and each of the plurality of string sequences obtained in the past collected data exceeds the predetermined level of similarity.

4. The method as claimed in claim 1, wherein the network is a blockchain network, and the method comprises:
   awarding coins, tokens and/or assets to a user account of the user according to amount of time of the software usage after validation of the software usage by the user.

5. The method as claimed in claim 4, wherein the method comprises:
   using one or more blockchain providers to enable transactions involving coins, tokens and/or assets to take place across different blockchains, wherein each blockchain provider is associated with one or more cryptocurrency.

6. The method as claimed in claim 4, wherein the coins, tokens and/or assets to be awarded for software usage of the piece of software are configured to be associated with the piece of software and different from coins, tokens and/or assets being awarded for software usage of the other software.

7. The method as claimed in claim 1, wherein the method comprises:
   capturing images of the piece of software as it is running on the apparatus;
   extracting image descriptors from each image of the captured images;
   processing the extracted image descriptors to generate input to a first model of the neural network;
   processing output of the first model to determine a category for the captured image from which the image descriptors are extracted;
   extracting one or more features present in the captured image according to predetermined criteria for feature extraction for the category; and
   processing the extracted one or more features to determine whether the user is using the piece of software.

8. The method as claimed in claim 1, wherein the method comprises:
   awarding coins, tokens and/or assets to a user account of the user according to amount of time of the software usage after validation of the software usage by the user.

9. The method as claimed in claim 1, the method comprises:

capturing images of the user using a camera of the apparatus as the piece of software is running; and processing the captured images to generate data to determine whether the user is using the piece of software.

10. The method as claimed in claim 1, the method comprises:

capturing user inputs entered using a user input interface of the apparatus; and processing the user inputs to generate data to determine whether the user is using the piece of software.

11. The method as claimed in claim 1, the method comprises:

capturing user heat emission profile via one or more thermal sensors; and processing the user heat emission profile to generate data to determine whether the user is using the piece of software.

12. The method as claimed in claim 1, the method comprises:

obtaining data about user or device location, motion, positioning, and/or orientation as one or more parameters to determine whether the user is using the piece of software.

13. The method as claimed in claim 1, wherein the method comprises:

sequentially hashing each of the plurality of data packets in chronological order as each data packet is generated, wherein time period between the hashing of every two consecutively generated data packets is substantially constant.

14. The method as claimed in claim 1, wherein the method comprises:

electronically or digitally signing each data packet with a signature associated with the user to enable the signed data packet to be authenticated.

15. The method as claimed in claim 1, wherein whether the user is actively using the piece of software and not idling is considered during the determination of whether the user is using the software.

16. The method as claimed in claim 1, wherein the collected data includes a sound and/or video recording of the user using the software.

17. The method as claimed in claim 16, wherein the video recording is to capture one or more user gestures, track user eye, and/or facial expressions, which is to be processed to determine that the user is using the software in a predetermined manner, and/or determine that the user is indeed using the software.

18. The method as claimed in claim 1, wherein the collected data includes data of verified biometric information of the user.

19. The method as claimed in claim 1, wherein the collected data includes key presses, touchscreen inputs, commands and/or text entered by the user and time of entry of these key presses, touchscreen inputs, commands and/or text, wherein the time of entry is a factor to distinguish between different instances of software usage.

20. The method as claimed in claim 1, wherein the collected data includes a photograph or a snapshot taken by the user using the apparatus, which is to be processed to determine that the user is present and/or using the software in a predetermined manner.

21. The method as claimed in claim 1, wherein during the voting, comparison between the existing model and the updated model is to be conducted by one or more nodes in the blockchain network and each node produces a vote to be collated for determining the final result of the voting.

22. An apparatus for validating software usage, the apparatus comprises:

a processor for executing instructions stored in a memory to operate the apparatus to:

collect data when a piece of software is running on the apparatus and the piece of software is being used by a user, wherein the collected data includes data indicative of one or more user activities;

periodically generate a data packet containing the data collected when the piece of software is running to obtain a plurality of the data packets;

sending each data packet for verification to verify that the data packet is generated according to predetermined rules governing the periodic generation of the data packet;

sending a plurality of the verified data packets for checking that the collected data contained in the plurality of the verified data packets determine whether the user is using the software during the time of collection of the collected data, and for checking whether the checked collected data contained in the plurality of the verified data packets have similarity with past collected data that exceeds a predetermined level of similarity; and sending the collected data contained in the plurality of the verified data packets to a neural network to determine whether the user is using the piece of software within a time frame associated with the collected data contained in the plurality of the verified data packets, wherein software usage by a user is deemed to be validated if it is determined that the user is using the software and no past collected data exceeding the predetermined level of similarity is found, wherein the apparatus comprises a network connector to connect to a blockchain network wherein an existing model of the neural network is to be subjected to training to produce an updated model, wherein the updated model is subjected to voting in the blockchain network, wherein whether the updated model is to be implemented for the blockchain network depends on a final result of the voting.

23. The apparatus as claimed in claim 22, wherein the apparatus is operable to:

assemble the plurality of data packets to create a data block, wherein the collected data contained in the plurality of the verified data packets to be subjected to the similarity check against past collected data are the collected data contained in the data block.

24. The apparatus as claimed in claim 22, wherein during the similarity check against past collected data to be conducted, the collected data contained in the data block is encoded to obtain a string sequence; and the string sequence is compared with a plurality of string sequences obtained from the past collected data to determine a degree of similarity between the string sequence and each of the plurality of string sequences obtained in the past collected data, wherein software usage by the user is not validated if the degree of similarity between the string sequence and each of the plurality of string sequences obtained in the past collected data exceeds the predetermined level of similarity.

25. The apparatus as claimed in claim 22, wherein the apparatus comprises a network connector to connect to a blockchain network, and coins, tokens and/or assets are awarded to a user account of the user according to amount of time of the software usage after validation of the software usage by the user.

26. The apparatus as claimed in claim 25, wherein the apparatus is operable to:

use one or more blockchain providers to enable transactions involving coins, tokens and/or assets to take place across different blockchains, wherein each blockchain provider is associated with one or more cryptocurrency.

27. The apparatus as claimed in claim 25, wherein the coins, tokens and/or assets to be awarded for software usage of the piece of software are configured to be associated with the piece of software and different from coins, tokens and/or assets being awarded for software usage of the other software.

28. The apparatus as claimed in claim 22, wherein the collected data contained in the plurality of the verified data packets are sent to a neural network to determine whether the user is using the piece of software within a time frame associated with the collected data contained in the plurality of the verified data packets.

29. The apparatus as claimed in claim 28, wherein the apparatus is operable to:

capture images of the piece of software as it is running; and subject each image of the captured images to processing to extract image descriptors from the image, wherein the extracted image descriptors are to be processed to generate input to a first model of the neural network to produce an output, and the output of the first model is to be processed to determine a category for the captured image from which the image descriptors are extracted, wherein one or more features present in the captured image extracted according to predetermined criteria for feature extraction for the category, and the extracted one or more features are to be processed to determine whether the user is using the piece of software.

30. The apparatus as claimed in claim 28, wherein coins, tokens and/or assets are awarded to a user account of the user according to amount of time of the software usage after validation of the software usage by the user.

31. The apparatus as claimed in claim 22, wherein the apparatus is operable to:

capture images of the user using a camera of the apparatus as the piece of software is running; and process the captured images to generate data to determine whether the user is using the piece of software.

32. The apparatus as claimed in claim 22, wherein the apparatus is operable to:

capture user inputs entered using a user input interface of the apparatus; and process the user inputs to generate data to determine whether the user is using the piece of software.

33. The apparatus as claimed in claim 22, wherein the apparatus is operable to:

capture user thermal profile via one or more thermal sensors; and process the user thermal profile to generate data to determine whether the user is using the piece of software.

34. The apparatus as claimed in claim 22, wherein the apparatus is operable to:

obtain data about user or device location, motion, positioning, and/or orientation as one or more parameters to determine whether the user is using the piece of software.

35. The apparatus as claimed in claim 22, wherein the apparatus is operable to:

subject each of the plurality of data packets to sequential hashing in chronological order as each data packet is generated, wherein time period between the hashing of every two consecutively generated data packets is substantially constant.

36. The apparatus as claimed in claim 22, wherein the apparatus is operable to:

electronically or digitally sign each data packet with a signature associated with the user to enable the signed data packet to be authenticated.

37. The apparatus as claimed in claim 22, wherein whether the user is actively using the piece of software and not idling is considered during the determination of whether the user is using the software.

38. The apparatus as claimed in claim 22, wherein the collected data includes a sound and/or video recording of the user using the software.

39. The apparatus as claimed in claim 38, wherein the video recording is to capture one or more user gestures, track user eye, and/or facial expressions, which is to be processed to determine that the user is using the software in a predetermined manner, and/or determine that the user is indeed using the software.

40. The apparatus as claimed in claim 22, wherein the collected data includes data of verified biometric information of the user.

41. The apparatus as claimed in claim 22, wherein the collected data includes key presses, touchscreen inputs, commands and/or text entered by the user and time of entry of these key presses, touchscreen inputs, commands and/or text, wherein the time of entry is a factor to distinguish between different instances of software usage.

42. The apparatus as claimed in claim 22, wherein the collected data includes a photograph or a snapshot taken by the user using the apparatus, which is to be processed to determine that the user is present and/or using the software in a predetermined manner.

43. The apparatus as claimed in claim 22, wherein during the voting, comparison between the existing model and the updated model is to be conducted by one or more nodes in the blockchain network and each node produces a vote to be collated for determining the final result of the voting.

* * * * *